US008196041B2

(12) United States Patent
Carro

(10) Patent No.: US 8,196,041 B2
(45) Date of Patent: *Jun. 5, 2012

(54) METHOD AND SYSTEM FOR PROCESSING INFORMATION RELATING TO ACTIVE REGIONS OF A PAGE OF PHYSICAL DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/842,192

(22) Filed: Aug. 21, 2007

(65) Prior Publication Data

US 2008/0017422 A1    Jan. 24, 2008

Related U.S. Application Data

(63) Continuation of application No. 10/818,790, filed on Apr. 6, 2004, now Pat. No. 7,310,779.

(30) Foreign Application Priority Data

Jun. 26, 2003 (FR) .................................. 03 368054

(51) Int. Cl.
G06F 3/01 (2006.01)
G06F 3/048 (2006.01)
G06F 3/033 (2006.01)
(52) U.S. Cl. ......... 715/702; 715/768; 715/790; 715/863
(58) Field of Classification Search .................. 715/702, 715/704, 760–761, 768, 783, 810, 823, 835, 715/846–847, 866, 763, 781, 790, 793, 863
See application file for complete search history.

(56) References Cited

U.S. PATENT DOCUMENTS 3,760,360 A    9/1973 Reynolds et al.
(Continued)

FOREIGN PATENT DOCUMENTS

EP    0622722    11/1994
(Continued)

OTHER PUBLICATIONS

System and Method for Providing and Accessing Information Related With Visually Distinctive Pysical Items; IBM; IP.com No. IPCOM000020374D; Nov. 18, 2003; 3 pages; ip.com PriorArtDatabase; www.ip.com.

(Continued)

*Primary Examiner* — William Bashore
*Assistant Examiner* — Andrew Tank
(74) *Attorney, Agent, or Firm* — Schmeiser, Olsen & Watts; John Pivnichny

(57) ABSTRACT

A method and system for processing information relating to active regions of a page of physical document. A transparent electro-luminescent tablet or other touch sensitive plate is coupled to a workstation and positioned over the page. Active regions traced on the page by a first user are received from the tablet or plate by a workstation and recorded in an active regions table within the workstation. Information recorded in the active regions table include: identification of the active regions and associated hyperlinks received by the workstation from the first user; and geometric coordinates defining an outline of each active region. The workstation receives from a second user coordinates pertaining to a point within at least one active region, from which and from information in the active regions table, the workstation identifies the at least one active region and displays its associated hyperlinks on a computer screen of the workstation.

21 Claims, 18 Drawing Sheets

U.S. PATENT DOCUMENTS

| | | | |
|---|---|---|---|
| 4,190,831 A | 2/1980 | Stahle et al. | |
| 4,263,592 A | 4/1981 | Takahashi et al. | |
| 4,274,081 A | 6/1981 | Nomura et al. | |
| 4,277,783 A | 7/1981 | Sampieri et al. | |
| 4,289,333 A | 9/1981 | Gaetano | |
| 4,348,660 A | 9/1982 | Robertsen et al. | |
| 4,367,465 A | 1/1983 | Mati et al. | |
| 4,377,810 A | 3/1983 | Wolff | |
| 4,454,417 A | 6/1984 | May | |
| 4,504,913 A | 3/1985 | Miura et al. | |
| 4,523,188 A | 6/1985 | Huber | |
| 4,532,395 A | 7/1985 | Zukowski | |
| 4,550,310 A | 10/1985 | Yamaguchi et al. | |
| 4,565,947 A | 1/1986 | Minn | |
| 4,571,684 A | 2/1986 | Takanabe et al. | |
| 4,591,841 A | 5/1986 | Gunderson et al. | |
| 4,602,907 A | 7/1986 | Foster | |
| 4,620,107 A | 10/1986 | Frame | |
| 4,642,459 A | 2/1987 | Caswell et al. | |
| 4,661,811 A | 4/1987 | Gray et al. | |
| 4,675,665 A | 6/1987 | Halliwell | |
| 4,677,428 A | 6/1987 | Bartholow | |
| 4,680,430 A | 7/1987 | Yoshikawa et al. | |
| 4,697,175 A | 9/1987 | Macdonald | |
| 4,782,328 A | 11/1988 | Denlinger | |
| 4,789,836 A | 12/1988 | May | |
| 4,802,722 A | 2/1989 | Persson | |
| 4,812,828 A | 3/1989 | Nishi et al. | |
| 4,812,980 A | 3/1989 | Yamada et al. | |
| 4,849,911 A | 7/1989 | Campian | |
| 4,853,498 A | 8/1989 | Meadows et al. | |
| 4,855,725 A | 8/1989 | Fernandez | |
| 4,868,912 A | 9/1989 | Doering | |
| 4,868,919 A | 9/1989 | Tanaka et al. | |
| 4,923,401 A | 5/1990 | Marshall et al. | |
| 4,952,918 A | 8/1990 | Fujita et al. | |
| 4,973,960 A | 11/1990 | Mount, II | |
| 5,010,323 A | 4/1991 | Hoffman | |
| 5,063,600 A | 11/1991 | Norwood | |
| 5,070,467 A | 12/1991 | Todome | |
| 5,105,544 A | 4/1992 | Ontiveros et al. | |
| 5,134,389 A | 7/1992 | Furuta et al. | |
| 5,138,304 A | 8/1992 | Bronson | |
| 5,149,919 A | 9/1992 | Greanias et al. | |
| 5,150,457 A | 9/1992 | Behm et al. | |
| 5,151,688 A | 9/1992 | Tanaka et al. | |
| 5,179,368 A | 1/1993 | Lippincott | |
| 5,187,467 A | 2/1993 | Myers | |
| 5,202,828 A | 4/1993 | Vertelney et al. | |
| 5,231,698 A | 7/1993 | Forcier | |
| 5,239,152 A | 8/1993 | Caldwell et al. | |
| 5,243,149 A | 9/1993 | Comerford et al. | |
| 5,250,929 A | 10/1993 | Hoffman et al. | |
| RE34,476 E | 12/1993 | Norwood | |
| 5,283,557 A | 2/1994 | Memarzadeh | |
| 5,311,302 A | 5/1994 | Berry et al. | |
| 5,315,129 A | 5/1994 | Forrest et al. | |
| 5,315,667 A | 5/1994 | Fujisaki et al. | |
| 5,353,016 A | 10/1994 | Kurita et al. | |
| 5,402,151 A | 3/1995 | Duwaer | |
| 5,422,812 A | 6/1995 | Knoll et al. | |
| 5,448,263 A | 9/1995 | Martin | |
| 5,495,581 A | 2/1996 | Tsai | |
| 5,555,354 A | 9/1996 | Strasnick et al. | |
| 5,572,643 A | 11/1996 | Judson | |
| 5,597,183 A | 1/1997 | Johnson | |
| 5,600,348 A | 2/1997 | Bartholow et al. | |
| 5,624,265 A | 4/1997 | Redford et al. | |
| 5,640,193 A | 6/1997 | Wellner | |
| 5,646,650 A | 7/1997 | Miller et al. | |
| 5,654,529 A | 8/1997 | Yeung et al. | |
| 5,668,576 A | 9/1997 | Ikura et al. | |
| 5,691,749 A | 11/1997 | Sugiyama | |
| 5,692,073 A | 11/1997 | Cass | |
| 5,703,436 A | 12/1997 | Forrest et al. | |
| 5,706,030 A | 1/1998 | Ishigami et al. | |
| 5,717,435 A | 2/1998 | Fukushima et al. | |
| 5,737,740 A | 4/1998 | Henderson et al. | |
| 5,739,814 A | 4/1998 | Ohara et al. | |
| 5,742,279 A | 4/1998 | Yamamoto et al. | |
| 5,757,026 A | 5/1998 | Forrest et al. | |
| 5,757,139 A | 5/1998 | Forrest et al. | |
| 5,811,833 A | 9/1998 | Thompson | |
| 5,818,425 A | 10/1998 | Want et al. | |
| 5,834,893 A | 11/1998 | Bulovic et al. | |
| 5,844,363 A | 12/1998 | Gu et al. | |
| 5,850,214 A | 12/1998 | McNally et al. | |
| 5,861,219 A | 1/1999 | Thompson et al. | |
| 5,861,885 A | 1/1999 | Strasnick et al. | |
| 5,870,767 A | 2/1999 | Kraft, IV | |
| 5,877,752 A | 3/1999 | Puthuff et al. | |
| 5,897,648 A | 4/1999 | Henderson | |
| 5,903,729 A | 5/1999 | Reber et al. | |
| 5,905,251 A | 5/1999 | Knowles | |
| 5,915,285 A | 6/1999 | Sommer | |
| 5,917,280 A | 6/1999 | Burrows et al. | |
| 5,918,012 A | 6/1999 | Astiz et al. | |
| 5,923,388 A | 7/1999 | Kurashima et al. | |
| 5,929,834 A | 7/1999 | Knoue et al. | |
| 5,932,895 A | 8/1999 | Shen et al. | |
| 5,953,001 A | 9/1999 | Challener et al. | |
| 5,953,587 A | 9/1999 | Forrest et al. | |
| 5,957,695 A | 9/1999 | Redford et al. | |
| 5,957,697 A | 9/1999 | Iggulden et al. | |
| 5,959,616 A | 9/1999 | Challener | |
| 5,965,981 A | 10/1999 | Inoguchi et al. | |
| 5,984,362 A | 11/1999 | Christman | |
| 5,986,401 A | 11/1999 | Thompson et al. | |
| 5,990,869 A | 11/1999 | Kubica et al. | |
| 5,995,084 A | 11/1999 | Chan et al. | |
| 5,998,803 A | 12/1999 | Forrest et al. | |
| 6,005,252 A | 12/1999 | Forrest et al. | |
| 6,013,538 A | 1/2000 | Burrows et al. | |
| 6,013,982 A | 1/2000 | Thompson et al. | |
| 6,035,330 A | 3/2000 | Astiz et al. | |
| 6,045,930 A | 4/2000 | Thompson et al. | |
| 6,046,543 A | 4/2000 | Bulovic et al. | |
| 6,048,630 A | 4/2000 | Burrows et al. | |
| 6,067,080 A | 5/2000 | Holtzman | |
| 6,081,261 A | 6/2000 | Wolff et al. | |
| 6,097,376 A | 8/2000 | Rothschild et al. | |
| 6,115,008 A | 9/2000 | Palalau et al. | |
| 6,115,088 A | 9/2000 | Zhang et al. | |
| 6,138,072 A | 10/2000 | Nagai | |
| 6,144,932 A | 11/2000 | Hachiya | |
| 6,148,260 A | 11/2000 | Musk et al. | |
| 6,150,043 A | 11/2000 | Thompson et al. | |
| 6,154,213 A | 11/2000 | Rennison et al. | |
| 6,166,834 A | 12/2000 | Taketomi et al. | |
| 6,167,382 A | 12/2000 | Sparks et al. | |
| 6,181,301 B1 | 1/2001 | Inoguchi et al. | |
| 6,185,683 B1 | 2/2001 | Ginter et al. | |
| 6,212,297 B1 | 4/2001 | Sklarew | |
| 6,256,009 B1 | 7/2001 | Lui et al. | |
| 6,256,638 B1 | 7/2001 | Dougherty et al. | |
| 6,256,649 B1 | 7/2001 | MacKinley et al. | |
| 6,279,014 B1 | 8/2001 | Schilit | |
| 6,282,539 B1 | 8/2001 | Luca | |
| 6,297,804 B1 | 10/2001 | Kashitani | |
| 6,304,898 B1 | 10/2001 | Shiigi | |
| 6,322,262 B1 | 11/2001 | Trosterud | |
| 6,326,946 B1 | 12/2001 | Moran et al. | |
| 6,330,976 B1 | 12/2001 | Dymetman et al. | |
| 6,343,138 B1 | 1/2002 | Rhoads | |
| 6,343,273 B1 | 1/2002 | Nahan et al. | |
| 6,343,283 B1 | 1/2002 | Saito et al. | |
| 6,353,850 B1 | 3/2002 | Wies et al. | |
| 6,356,923 B1 | 3/2002 | Yano et al. | |
| 6,389,541 B1 | 5/2002 | Patterson | |
| 6,396,283 B1 | 5/2002 | Kimoto | |
| 6,396,598 B1 | 5/2002 | Kashiwagi et al. | |
| 6,407,757 B1 | 6/2002 | Ho | |
| 6,424,094 B1 | 7/2002 | Feldman | |
| 6,429,846 B2 | 8/2002 | Rosenberg et al. | |
| 6,448,979 B1 | 9/2002 | Schena et al. | |
| 6,512,840 B1 | 1/2003 | Tognazzini | |
| 6,537,324 B1 | 3/2003 | Tabata et al. | |

| Patent No. | Date | Name |
|---|---|---|
| 6,546,397 B1 | 4/2003 | Rempell |
| 6,587,859 B2 | 7/2003 | Dougherty et al. |
| 6,647,130 B2 | 11/2003 | Rhoads |
| 6,650,889 B1 | 11/2003 | Evans et al. |
| 6,674,425 B1 | 1/2004 | Louis et al. |
| 6,674,426 B1 | 1/2004 | McGee et al. |
| 6,681,045 B1 | 1/2004 | Lapstun et al. |
| 6,738,049 B2 | 5/2004 | Kiser et al. |
| 6,752,317 B2 | 6/2004 | Dymetman et al. |
| 6,762,775 B2 | 7/2004 | Ho |
| 6,771,283 B2 | 8/2004 | Carro |
| 6,788,293 B1 | 9/2004 | Silverbrook et al. |
| 6,798,907 B1 | 9/2004 | Clary et al. |
| 6,814,624 B2 | 11/2004 | Clark et al. |
| 6,814,642 B2 | 11/2004 | Siwinski et al. |
| 6,824,066 B2 | 11/2004 | Weyant |
| 6,904,570 B2 | 6/2005 | Foote et al. |
| 6,940,491 B2 | 9/2005 | Incertis Carro |
| 6,963,334 B1 | 11/2005 | Stevens et al. |
| 6,976,220 B1 | 12/2005 | Lapstun et al. |
| 6,980,202 B2 | 12/2005 | Carro |
| 7,003,308 B1 | 2/2006 | Fuoss et al. |
| 7,027,038 B2 | 4/2006 | Carro |
| 7,050,835 B2 | 5/2006 | Hack et al. |
| 7,116,316 B2 | 10/2006 | Jelinek et al. |
| 7,181,502 B2 | 2/2007 | Incertis |
| 7,310,779 B2 | 12/2007 | Carro |
| 7,373,588 B2 | 5/2008 | Carro |
| 7,472,338 B2 | 12/2008 | Carro |
| 7,530,023 B2 | 5/2009 | Carro |
| 7,574,407 B2 | 8/2009 | Carro et al. |
| 7,747,949 B2 | 6/2010 | Incertis Carro |
| 2001/0039587 A1 | 11/2001 | Uhler et al. |
| 2001/0053252 A1 | 12/2001 | Creque |
| 2001/0056439 A1 | 12/2001 | Carro |
| 2002/0013129 A1 | 1/2002 | Davies |
| 2002/0047870 A1 | 4/2002 | Carro |
| 2002/0057836 A1 | 5/2002 | Lui et al. |
| 2002/0076111 A1 | 6/2002 | Dance et al. |
| 2002/0078088 A1 | 6/2002 | Kuruoglu et al. |
| 2002/0083090 A1 | 6/2002 | Jeffrey et al. |
| 2002/0087598 A1 | 7/2002 | Carro |
| 2002/0101447 A1 | 8/2002 | Carro |
| 2002/0116477 A1 | 8/2002 | Somashekar et al. |
| 2002/0152216 A1 | 10/2002 | Bouthors |
| 2002/0152236 A1 | 10/2002 | Incertis-Carro |
| 2002/0184332 A1 | 12/2002 | Kindberg et al. |
| 2003/0001899 A1 | 1/2003 | Partanen et al. |
| 2003/0002068 A1 | 1/2003 | Constantin et al. |
| 2003/0006913 A1 | 1/2003 | Joyce et al. |
| 2003/0024975 A1 | 2/2003 | Rajasekharan |
| 2003/0030839 A1 | 2/2003 | Walters et al. |
| 2003/0048487 A1 | 3/2003 | Johnston et al. |
| 2003/0103238 A1 | 6/2003 | MacLean et al. |
| 2003/0117378 A1 | 6/2003 | Carro |
| 2003/0117379 A1 | 6/2003 | Carro |
| 2003/0130952 A1 | 7/2003 | Bell et al. |
| 2003/0191852 A1 | 10/2003 | Incertis |
| 2004/0167895 A1 | 8/2004 | Carro |
| 2004/0262051 A1 | 12/2004 | Carro |
| 2005/0028092 A1 | 2/2005 | Carro |
| 2006/0065859 A1 | 3/2006 | Lapstun et al. |
| 2006/0167754 A1 | 7/2006 | Carro |
| 2007/0228177 A1 | 10/2007 | Lapstun et al. |
| 2009/0013247 A1 | 1/2009 | Carro |
| 2009/0299871 A1 | 12/2009 | Carro |

FOREIGN PATENT DOCUMENTS

| | | |
|---|---|---|
| EP | 0652505 | 5/1995 |
| EP | 1186986 A2 * | 3/2002 |
| JP | 01-195318 | 8/1989 |
| JP | 5-15075 | 2/1993 |
| JP | 05-145724 | 6/1993 |
| JP | 05-189185 | 7/1993 |
| JP | 09-046776 | 2/1997 |
| JP | 09-305752 | 11/1997 |
| JP | 10-040055 | 2/1998 |
| JP | 11-134327 | 5/1999 |
| JP | 11-264972 | 9/1999 |
| JP | 2000-056896 | 2/2000 |
| JP | 2000-125024 | 4/2000 |
| JP | 2000-172402 | 6/2000 |
| JP | 2002-091827 | 3/2002 |
| JP | 2002-099743 | 4/2002 |
| WO | 98/38761 | 9/1998 |
| WO | 00/72460 | 11/2000 |
| WO | 00/73981 | 12/2000 |
| WO | 01/77795 | 10/2001 |
| WO | 01/83213 | 11/2001 |
| WO | 02/052488 | 7/2002 |
| WO | 03/042862 | 5/2003 |

OTHER PUBLICATIONS

Miller, Michael; The Complete Idiot's Guide to Online Search Secrets; Published by Alpha Books 1999.

Hayes, Deidre; Sams Teach Yourself HTML 4 in 10 Minutes; Second Edition; Published by Sams Publishing 1999.

Yahoo!, Internet Archive Wayback Machine: "http://www.yahoo.com" Dec. 12, 1998.

AltaVista Babelfish, Internet Archive Wayback Machine: "http://babelfish.altavista.com" Dec. 12, 1998.

Introduction to Image Maps; 4 pages; http://www.ryerson.ca/mps024/notes/imagemaps/, Mar. 23, 2007.

Official Bluetooth® Technology Info Site; 1 page; http://www.bluetooth.com/bluetooth/, Mar. 23, 2007.

WACOM, PL Series, LCD Pen Tablet Systems; 1 page; http://www.wacom.com/lcdtablets/Archive.org, Aug. 15, 2000.

Toled Technology, 2 pages; www.universaldisplay.com/toled.htmlArchive.org, Sep. 13, 1999.

Office Action (Mail Date Nov. 17, 2004) for U.S. Appl. No. 10/317,504, filed Dec. 12, 2002; Confirmation No. 7411.

Amendment filed Feb. 8, 2005 in response to Office Action (Mail Date Nov. 17, 2004) for U.S. Appl. No. 10/317,504, filed Dec. 12, 2002; Confirmation No. 7411.

Office Action (Mail Date Jul. 28, 2005) for U.S. Appl. No. 10/317,504, filed Dec. 12, 2002; Confirmation No. 7411.

Amendment filed Sep. 2, 2005 in response to Office Action (Mail Date Jul. 28, 2005) for U.S. Appl. No. 10/317,504, filed Dec. 12, 2002; Confirmation No. 7411.

Office Action (Mail Date Nov. 15, 2005) for U.S. Appl. No. 10/317,504, filed Dec. 12, 2002; Confirmation No. 7411.

Amendment filed Jan. 30, 2006 in response to Office Action (Mail Date Nov. 15, 2005) for U.S. Appl. No. 10/317,504, filed Dec. 12, 2002; Confirmation No. 7411.

Final Office Action (Mail Date May 18, 2006) for U.S. Appl. No. 10/317,504, filed Dec. 12, 2002; Confirmation No. 7411.

Amendment filed Jul. 18, 2006 in response to Final Office Action (Mail Date May 18, 2006) for U.S. Appl. No. 10/317,504, filed Dec. 12, 2002; Confirmation No. 7411.

Office Action (Mail Date Aug. 4, 2006) for U.S. Appl. No. 10/317,504, filed Dec. 12, 2002; Confirmation No. 7411.

Amendment filed Oct. 18, 2006 in response to Office Action (Mail Date Aug. 4, 2006) for U.S. Appl. No. 10/317,504, filed Dec. 12, 2002; Confirmation No. 7411.

Final Office Action (Mail Date Jan. 9, 2007) for U.S. Appl. No. 10/317,504, filed Dec. 12, 2002; Confirmation No. 7411.

Amendment and Request for Continued Examination filed Apr. 9, 2007 in response to Final Office Action (Mail Date Jan. 9, 2007) for U.S. Appl. No. 10/317,504, filed Dec. 12, 2002; Confirmation No. 7411.

Office Action (Mail Date Jun. 26, 2007) for U.S. Appl. No. 10/317,504, filed Dec. 12, 2002; Confirmation No. 7411.

Amendment filed Aug. 8, 2007 in response to Office Action (Mail Date Jun. 26, 2007) for U.S. Appl. No. 10/317,504, filed Dec. 12, 2002; Confirmation No. 7411.

Final Office Action (Mail Date Sep. 17, 2007) for U.S. Appl. No. 10/317,504, filed Dec. 12, 2002; Confirmation No. 7411.

Amendment and Request for Continued Examination filed Oct. 26, 2007 in response to Final Office Action (Mail Date Sep. 17, 2007) for U.S. Appl. No. 10/317,504, filed Dec. 12, 2002; Confirmation No. 7411.

Office Action (Mail Date Dec. 13, 2007) for U.S. Appl. No. 10/317,504, filed Dec. 12, 2002; Confirmation No. 7411.
Amendment filed Mar. 13, 2008 in response to Office Action (Mail Date Dec. 13, 2007) for U.S. Appl. No. 10/317,504, filed Dec. 12, 2002; Confirmation No. 7411.
Final Office Action (Mail Date Jun. 25, 2008) for U.S. Appl. No. 10/317,504, filed Dec. 12, 2002; Confirmation No. 7411.
Supplemental Final Office Action (Mail Date Sep. 4, 2008) for U.S. Appl. No. 10/317,504, filed Dec. 12, 2002; Confirmation No. 7411.
Amendment and Request for Continued Examination filed Dec. 4, 2008 in response to Supplemental Final Office Action (Mail Date Sep. 4, 2008) for U.S. Appl. No. 10/317,504, filed Dec. 12, 2002; Confirmation No. 7411.
Notice re Non-compliant Amendment (Mail Date Feb. 18, 2009) in connection with Amendment filed Dec. 4, 2008 in response to Supplemental Final Office Action (Mail Date Sep. 4, 2008) for U.S. Appl. No. 10/317,504, filed Dec. 12, 2002; Confirmation No. 7411.
Amendment filed Feb. 20, 2009 in response to Notice re Non-compliant Amendment (Mail Date Feb. 18, 2009) in connection with Amendment filed Dec. 4, 2008 in response to Supplemental Final Office Action (Mail Date Sep. 4, 2008) for U.S. Appl. No. 10/317,504, filed Dec. 12, 2002; Confirmation No. 7411.
Office Action (Mail Date May 12, 2009) for U.S. Appl. No. 10/317,504, filed Dec. 12, 2002; Confirmation No. 7411.
Amendment filed Jul. 23, 2009 in response to Office Action (Mail Date May 12, 2009) for U.S. Appl. No. 10/317,504, filed Dec. 12, 2002; Confirmation No. 7411.
Final Office Action (Mail Date Feb. 23, 2010) for U.S. Appl. No. 10/317,504, filed Dec. 12, 2002; Confirmation No. 7411.
Notice of Appeal filed May 13, 2010 for U.S. Appl. No. 10/317,504, filed Dec. 12, 2002; Confirmation No. 7411.
Amendment and Request for Continued Examination filed Jul. 13, 2010 in response to Final Office Action (Mail Date Feb. 23, 2010) for U.S. Appl. No. 10/317,504, filed Dec. 12, 2002; Confirmation No. 7411.
Office Action (Mail Date May 10, 2011) for U.S. Appl. No. 10/317,504, filed Dec. 12, 2002; Confirmation No. 7411.
Amendment filed Aug. 10, 2011 in response to Office Action (Mail Date May 10, 2011) for U.S. Appl. No. 10/317,504, filed Dec. 12, 2002; Confirmation No. 7411.
Office Action (Mail Date Nov. 29, 2004) for U.S. Appl. No. 10/317,524, filed Dec. 12, 2002; Confirmation No. 6599.
Amendment filed Feb. 22, 2005 in response to Office Action (Mail Date Nov. 29, 2004) for U.S. Appl. No. 10/317,524, filed Dec. 12, 2002; Confirmation No. 6599.
Notice re Non-compliant Amendment (Mail Date Apr. 15, 2005 in connection with Amendment filed Feb. 22, 2005 in response to Office Action (Mail Date Nov. 29, 2004) for U.S. Appl. No. 10/317,524, filed Dec. 12, 2002; Confirmation No. 6599.
Amended filed May 16, 2005 in response to Notice re Non-compliant Amendment (Mail Date Apr. 15, 2005 in connecion with Amendment filed Feb. 22, 2005 in response to Office Action (Mail Date Nov. 29, 2004) for U.S. Appl. No. 10/317,524, filed Dec. 12, 2002; Confirmation No. 6599.
Notice of Allowance (Mail Date Jun. 13, 2005) for U.S. Appl. No. 10/317,524, filed Dec. 12, 2002; Confirmation No. 6599.
Office Action (Mail Date Mar. 21, 2006) for U.S. Appl. No. 10/295,683, filed Nov. 15, 2002; Confirmation No. 2284.
Amendment filed Mar. 23, 2006 in response to Office Action (Mail Date Mar. 2, 2006) for U.S. Appl. No. 10/295,683, filed Nov. 15, 2002; Confirmation No. 2284.
Final Office Action (Mail Date May 23, 2006) for U.S. Appl. No. 10/295,683, filed Nov. 15, 2002; Confirmation No. 2284.
Amendment filed Aug. 22, 2006 in response to Final Office Action (Mail Date May 23, 2006) for U.S. Appl. No. 10/295,683, filed Nov. 15, 2002; Confirmation No. 2284.
Notice of Allowance (Mail Date Sep. 21, 2006) for U.S. Appl. No. 10/295,683, filed Nov. 15, 2002; Confirmation No. 2284.
Preliminary Amendment filed Mar. 28, 2002 for U.S. Appl. No. 10/028,218, filed Oct. 25, 2001; Confirmation No. 2533.
Office Action (Mail Date Sep. 7, 2004) for U.S. Appl. No. 10/028,218, filed Oct. 25, 2001; Confirmation No. 2533.
Amendment filed Dec. 2, 2004 in response to Office Action (Mail Date Sep. 7, 2004) for U.S. Appl. No. 10/028,218, filed Oct. 25, 2001; Confirmation No. 2533.
Office Action (Mail Date Jan. 4, 2005) for U.S. Appl. No. 10/028,218, filed Oct. 25, 2001; Confirmation No. 2533.
Amendment filed Feb. 10, 2005 in response to Office Action (Mail Date Jna. 4, 2005) for U.S. Appl. No. 10/028,218, filed Oct. 25, 2001; Confirmation No. 2533.
Notice of Allowance (Mail Date Feb. 25, 2005) for U.S. Appl. No. 10/028,218, filed Oct. 25, 2001; Confirmation No. 2533.
Office Action (Mail Date Jul. 21, 2009) for U.S. Appl. No. 10/562,093, filed Dec. 21, 2005; Confirmation No. 8123.
Amended filed Oct. 13, 2009 in response to Office Action (Mail Date Jul. 21, 2009) for U.S. Appl. No. 10/562,093, filed Dec. 21, 2005; Confirmation No. 8123.
Notice of Allowance (Mail Date Feb. 17, 2010) for U.S. Appl. No. 10/562,093, filed Dec. 21, 2005; Confirmation No. 8123.
Cooltown Beacons, Hewlett Packard, 2 pages, http://cooltown.hp.com/beacon_ful.htm, retrieved from the Internet Nov. 18, 2011.
Cooltown, Hewlett Packard, 1 page, http://cooltown.hp.com/cooltownhome/index.asp, retrieved from the Internet Nov. 18, 2011.
Office Action (Mail Date May 26, 2005) for U.S. Appl. No. 09/923,150, filed Aug. 6, 2001; Confirmation No. 8930.
Amendment filed Aug. 12, 2005 in response to Office Action (Mail Date May 26, 2005) for U.S. Appl. No. 09/923,150, filed Aug. 6, 2001; Confirmation No. 8930.
Notice of Allowance (Mail Date Nov. 14, 2005) for U.S. Appl. No. 09/923,150, filed Aug. 6, 2001; Confirmation No. 8930.
Office Action (Mail Date Oct. 14, 2004) for U.S. Appl. No. 09/892,399, filed Jun. 26, 2001; Confirmation No. 2163.
Amendment filed Jan. 19, 2005 in response to Office Action (Mail Date Oct. 14, 2004) for U.S. Appl. No. 09/892,399, filed Jun. 26, 2001; Confirmation No. 2163.
Final Office Action (Mail Date Apr. 27, 2005) for U.S. Appl. No. 09/892,399, filed Jun. 26, 2001; Confirmation No. 2163.
Amendment filed Jun. 17, 2005 in response to Final Office Action (Mail Date Apr. 27, 2005) for U.S. Appl. No. 09/892,399, filed Jun. 26, 2001; Confirmation No. 2163.
Advisory Action (Mail Date Jul. 5, 2005) for U.S. Appl. No. 09/892,399, filed Jun. 26, 2001; Confirmation No. 2163.
Amendment and Request for Continued Examination filed Jul. 18, 2005 in response to Advisory Action (Mail Date Jul. 5, 2005) for U.S. Appl. No. 09/892,399, filed Jun. 26, 2001; Confirmation No. 2163.
Office Action (Mail Date Oct. 3, 2005) for U.S. Appl. No. 09/892,399, filed Jun. 26, 2001; Confirmation No. 2163.
Amendment filed Jan. 3, 2006 in response to Office Action (Mail Date Oct. 3, 2005) for U.S. Appl. No. 09/892,399, filed Jun. 26, 2001; Confirmation No. 2163.
Final Office Action (Mail Date Mar. 15, 2006) for U.S. Appl. No. 09/892,399, filed Jun. 26, 2001; Confirmation No. 2163.
Amendment filed May 18, 2006 in response to Final Office Action (Mail Date Mar. 15, 2006) for U.S. Appl. No. 09/892,399, filed Jun. 26, 2001; Confirmation No. 2163.
Advisory Action (Mail Date Jun. 7, 2006) for U.S. Appl. No. 09/892,399, filed Jun. 26, 2001; Confirmation No. 2163.
Notice of Appeal filed Jun. 15, 2006 for U.S. Appl. No. 09/892,399, filed Jun. 26, 2001; Confirmation No. 2163.
Appeal Brief filed Aug. 9, 2006 for U.S. Appl. No. 09/892,399, filed Jun. 26, 2001; Confirmation No. 2163.
Reply Brief (Mail Date Dec. 22, 2006) for U.S. Appl. No. 09/892,399, filed Jun. 26, 2001; Confirmation No. 2163.
Notice of Allowance (Mail Date Jul. 11, 2008) for U.S. Appl. No. 09/892,399, filed Jun. 26, 2001; Confirmation No. 2163.
Amendment after Notice of Allowance (Rule 312) filed Oct. 10, 2008) for U.S. Appl. No. 09/892,399, filed Jun. 26, 2001; Confirmation No. 2163.
Hoffnagle, Gene F. (Editor), Pervasive Computing, IBM Systems Journal, vol. 38, No. 4, 1999 (197 pages).
PCT International Search Report (Mail Date Sep. 25, 2003), PCT/EP 02/11126, International filing date Sep. 12, 2002.
PCT International Examination Report (Mail Date May 22, 2003), PCT/EP 02/11126, International filing date Sep. 12, 2002.

Manohar, et al.; A Framework for Programmable Overlay Multimedia Networks; IBM Journal of Research Development; vol. 43, No. 4, Jul. 1999, pp. 555-577.
Flynn, et al.; Multimedia—An Introduction; IBM Journal of Research Develompment; vol. 42, No. 2, Mar. 1998; pp. 165-176.
UDC Demonstrates Flexible and Transparent Displays at Annual Meeting, Universal Display Corporation, News Release, Jun. 23, 2000, 2 pages.
Poem Demos OLEDs to U.S. House of Congress, Princeton University News Release, Spring 1996, 1 page.
Libsch, et al.; Understanding Crosstalk in High-Resolution Color Thin-Film-Transistor Liquid Crystal Displays; IBM Journal of Research Development, vol. 42, No. 3/4, May/Jul. 1998; pp. 467-479.
Arai, et al.; PaperLink: A Technique for Hyperlinking from Real Paper to Electronic Content; Papers, CHI 97, Mar. 22-27, 1997, pp. 327-344.
Scott, J. Campbell; Organic Light-Emitting Diodes for Flat Panel Displays (OLEDs); http://w3.almaden.ibm.com/st/storage/displays/oled/oled.html; retrieved from the Internet Jun. 10, 2004.
Sheats, James; Introduction to Organic Light-Emitting Diodes (OLEDs); Rolltronics, Apr. 16, 2002, http://www.rolltronics.com/intro_oled.htp; retrieved from the Internet Nov. 22, 2011.
Robinson et al; The LivePaper System: Augmenting Paper on an Enhanced Tabletop; Computers & Graphics 25 (2011), pp. 731-745.
Heiner, et al.; Linking and Messaging from Real Paper in the Paper PDA, CHI Letters vol. 1, 1, 1999, pp. 179-186.
Robinson, et al.; A Framework for Interacting with Paper, proceedings of EUROGRAPHICS '97, vol. 16, No. 3, 9 pages.
Siio, et al.; Real-world Interaction using the FieldMouse, CHI Letters vol. 1, 1 1999, pp. 113-119.
Grasso, et al.; Augmenting Paper to Enhance Community Information Sharing, DARE 2000, Apr. 2000, Elsinore, Denmark, pp. 51-62.
Benson, Philippa Jane; the More Things Change . . . Paper Is Still With Us, Journal of Electronic Publishing, vol. 7, Issue 2, Dec., 2001, 7 pages, retrieved from the Internet Nov. 28, 2011.
McKNIGHT, Cliff; Electronic Journals: What Do Users Think of Them?, Department of Information and ibrary Studies, Loughborough University, Loughborough, Leics, UK, 7 pages, http://www.dl.ulis.ac.jp/ISDL97/proceedings/mcknight.html, retrieved from the Internet Nov. 28, 2011.
O'Hara, et al.; A Comparison of Reading Paper and On-Line Documents; Proceedings of CHI'97, Human Factors in Computing Systes, Mar. 22-27, 1997, Atlanta, Georgia, pp. 335-342.
Light, Ann; Fourteen Users in Search of a Newspaper: The Effect of Expectation on Online Behaviour, School of Cognitive and Computing Sciences, University of Sussex, CSRP 507, 13 pages, http://www.cogs.susx.ack.uk/users/ annl/Expectations.htm, retrieved from the Internet Nov. 28, 2011.
Bright Ideas from the National Archives for National History Day 1999, Science, Technology, Invention in History: Impact, Influence, Change, 3 pages, http://www.archives.gov/digital_classroom/history_day/bright_ideas/digitized_images.html, retrieved from the Internet Nov. 28, 2011.
Schilit, et al.; Digital Library Information Appliances, In Proceedings of Digital Libraries '98—Third ACM conference on Digital Libraries, Pittsburgh, P, Jun. 23-26, 1998, 10 pages.
Newman, et al.; A Desk Supporting Computer-based Interaction with Paper Documents, ACM, CHI '92, May 3-7, 1992, pp. 587-592.
Antoniadis, et al.; Science and Technology of Organic Electroluminescent Devices, Symposium G, Apr. 12-15, 1998, 17 pages, http://www.mrs.org/meetings/spring98/absbook/AbstractBookG.html, retrieved from the Internet Jun. 10, 2004.
Gu, et al.; A metal-free, full-color stacked organic light-emitting device, Applied Physics Letters, vol. 74, No. 2, Jan. 11, 1999, pp. 305-.
Scott, et al; Charge injection and transport in organic light emitting diodes, IBM Almaden Research Center, San Jose, CA, 1 page.
Kelley, et al.; Extending User-Centered Methods Beyond Interface Design to Functional Definition, Proceedings of the Human Factors and Ergonomics Society, 4th Annual Meeting, 1996, pp. 343-347.
Blickenstorfer, Conrad; IBM ThinkPad TransNote—A remarkable computer that didn't make it, pen Computing Magazine, Mar. 20, 2002, 5 pages, http://www.pencomputing.com/frames/ibm_transnote.html, retrieved from the Internet Mar. 27, 2004.
IBM Press Room; IBM Ammounces Delivery of ThinkPad TransNote, World's First Portfolio Notebook Computer, Feb. 20, 2001, 4 pages, http://www-03.ibm.com/press/us/en/pressrelease11380.wss, retrieved from the Internet Mar. 27. 2007.
IBM Research; Pen Technologies, 6 pages, http://www.research.ibm.com/electriclnk/, retrieved from the Internet Mar. 12, 2007.
Meyer, Andre; Pen Computing, A Technology Overvie and a Vision, Sigchi Bulleting, vol. 27, No. 3, Jul. 1995, pp. 46-90.
Office Action (Mail Date Mar. 13, 2007) for U.S. Appl. No. 10/818,790, filed Apr. 6, 2004; Confirmation No. 6013.
Amended filed May 18, 2007 in response to Office Action (Mail Date Mar. 13, 2007) for U.S. Appl. No. 10/818,790, filed Apr. 6, 2004; Confirmation No. 6013.
Notice of Allowance (Mail Date Aug. 13, 2007) for U.S. Appl. No. 10/818,790, filed Apr. 6, 2004; Confirmation No. 6013.
Office Action (Mail Date Nov. 24, 2003) for U.S. Appl. No. 09/841,930, filed Apr. 25, 2001; Confirmation No. 6591.
Amendment filed Feb. 27, 2004 in response to Office Action (Mail Date Nov. 24, 2003) for U.S. Appl. No. 09/841,930, filed Apr. 25, 2001; Confirmation No. 6591.
Notice of Allowance (Mail Date Feb. 22, 2004) for U.S. Appl. No. 09/841,930, filed Apr. 25, 2001; Confirmation No. 6591.
Preliminary Amendment filed Oct. 20, 2004 for U.S. Appl. No. 10/495,236, filed Oct. 4, 2004; Confirmation No. 1587.
Office Action (Mail Date Apr. 4, 2008) for U.S. Appl. No. 10/495,236, filed Oct. 4, 2004; Confirmation No. 1587.
Amendment filed Jun. 26, 2008 in response to Office Action (Mail Date Apr. 4, 2008) for U.S. Appl. No. 10/495,236, filed Oct. 4, 2004; Confirmation No. 1587.
Office Action (Mail Date Oct. 15, 2008) for U.S. Appl. No. 10/495,236, filed Oct. 4, 2004; Confirmation No. 1587.
Amendment filed Dec. 5, 2008 in response to Office Action (Mail Date Oct. 15, 2008) for U.S. Appl. No. 10/495,236, filed Oct. 4, 2004; Confirmation No. 1587.
Notice of Allowance (Mail Date Dec. 30, 2008) for U.S. Appl. No. 10/495,236, filed Oct. 4, 2004; Confirmation No. 1587.
Office Action (Mail Date Jul. 16, 2003) for U.S. Appl. No. 09/782,144, filed Feb. 13, 2001; Confirmation No. 9830.
Amendment filed Oct. 20, 2003 in response to Office Action (Mail Date Jul. 16, 2003) for U.S. Appl. No. 09/782,144, filed Feb. 13, 2001; Confirmation No. 9830.
Office Action (Mail Date Nov. 28, 2003) for U.S. Appl. No. 09/782,144, filed Feb. 13, 2001; Confirmation No. 9830.
Amendment filed Feb. 2, 2004 filed in response to Office Action (Mail Date Nov. 28, 2003) for U.S. Appl. No. 09/782,144, filed Feb. 13, 2001; Confirmation No. 9830.
Advisory Action (Mail Date Feb. 19, 2004) for U.S. Appl. No. 09/782,144, filed Feb. 13, 2001; Confirmation No. 9830.
Notice of Abandonment (Mail Date Sep. 13, 2004) for U.S. Appl. No. 09/782,144, filed Feb. 13, 2001; Confirmation No. 9830.
Office Action (Mail Date Jan. 24, 2007) for U.S. Appl. No. 10/786,201, filed Feb. 24, 2004; Confirmation No. 3700.
Notice of Appeal filed Apr. 16, 2007 for U.S. Appl. No. 10/786,201, filed Feb. 24, 2004; Confirmation No. 3700.
Advisory Action (Mail Date May 1, 2007) for U.S. Appl. No. 10/786,201, filed Feb. 24, 2004; Confirmation No. 3700.
Response filed Jun. 18, 2007 to Office Action (Mail Date Jan. 24, 2007) for U.S. Appl. No. 10/786,201, filed Feb. 24, 2004; Confirmation No. 3700.
Office Action (Mail Date Jul. 31, 2007) for U.S. Appl. No. 10/786,201, filed Feb. 24, 2004; Confirmation No. 3700.
Notice of Appeal filed Oct. 31, 2007 for U.S. Appl. No. 10/786,201, filed Feb. 24, 2004; Confirmation No. 3700.
Pre-Brief Appeal Decision (Mail Date Dec. 14, 2007) for U.S. Appl. No. 10/786,201, filed Feb. 24, 2004; Confirmation No. 3700.
Notice of Allowance (Mail Date Jan. 24, 2008) for U.S. Appl. No. 10/786,201, filed Feb. 24, 2004; Confirmation No. 3700.
Preliminary Amendment filed Apr. 6, 2005 for U.S. Appl. No. 10/530,535, filed Apr. 6, 2005; Confirmation No. 4718.
Office Action (Mail Date Jan. 9, 2008) for U.S. Appl. No. 10/530,535, filed Apr. 6, 2005; Confirmation No. 4718.

Amendment filed Apr. 18, 2008 in response to Office Action (Mail Date Jan. 9, 2008) for U.S. Appl. No. 10/530,535, filed Apr. 6, 2005; Confirmation No. 4718.
Notice re non-compliant amendment (Mail Date May 15, 2008) for U.S. Appl. No. 10/530,535, filed Apr. 6, 2005; Confirmation No. 4718.
Amendment filed May 22, 2008 in response to Notice re non-compliant amendment (Mail Date May 15, 2008) for U.S. Appl. No. 10/530,535, filed Apr. 6, 2005; Confirmation No. 4718.
Office Action (Mail Date Sep. 3, 2008) for U.S. Appl. No. 10/530,535, filed Apr. 6, 2005; Confirmation No. 4718.
Amendment filed Oct. 31, 2008 in response to Office Action (Mail Date Sep. 3, 2008) for U.S. Appl. No. 10/530,535, filed Apr. 6, 2005; Confirmation No. 4718.
Advisory Action (Mail Date Nov. 14, 2008) for U.S. Appl. No. 10/530,535, filed Apr. 6, 2005; Confirmation No. 4718.
Notice of Appeal filed Dec. 1, 2008 for U.S. Appl. No. 10/530,535, filed Apr. 6, 2005; Confirmation No. 4718.
Appeal Brief filed Dec. 5, 2008 for U.S. Appl. No. 10/530,535, filed Apr. 6, 2005; Confirmation No. 4718.
Notice of Allowance (Mail Date Mar. 31, 2009) for U.S. Appl. No. 10/530,535, filed Apr. 6, 2005; Confirmation No. 4718.
Office Action (Mail Date Sep. 13, 2010) for U.S. Appl. No. 12/537,480, filed Aug. 7, 2009; Confirmation No. 5435.
Amendment filed Dec. 3, 2010 in response to Office Action (Mail Date Sep. 13, 2010) for U.S. Appl. No. 12/537,480, filed Aug. 7, 2009; Confirmation No. 5435.
Office Action (Mail Date Jan. 24, 2011) for U.S. Appl. No. 12/537,480, filed Aug. 7, 2009; Confirmation No. 5435.
Amendment filed Apr. 13, 2011 in response to Office Action (Mail Date Jan. 24, 2011) for U.S. Appl. No. 12/537,480, filed Aug. 7, 2009; Confirmation No. 5435.
Notice of Allowance (Mail Date Jun. 2, 2011) for U.S. Appl. No. 12/537,480, filed Aug. 7, 2009; Confirmation No. 5435.
Request for Continued Examination filed Aug. 2, 2011 for U.S. Appl. No. 12/537,480, filed Aug. 7, 2009; Confirmation No. 5435.
Notice of Allowance (Mail Date Aug. 22, 2011) for U.S. Appl. No. 12/537,480, filed Aug. 7, 2009; Confirmation No. 5435.
Amendment after Notice of Allowance (Rule 312) filed Nov. 17, 2011 for U.S. Appl. No. 12/537,480, filed Aug. 7, 2009; Confirmation No. 5435.
Welcome to 3M Touch Systems—TouchTek4; http://web.archive.org/web/2011004132733/http://www.3m.com/US/ele . . . , 1 page, retrieved from the Internet Nov. 19, 2011.
IBM Monitors and Touch by MicroTouch . . . A Perfect Match; http://web.archive.org/web/20000815095939/http://www.microtouch.co . . . , 2 pages, retrieved from the Internet Nov. 20, 2011.
MicroTouch IBM Touch Monitor Solutions; http://web.archive.org/eb/20010215034326/http://www.microtouch.co . . . , 3 pages, retrieved from the Internet Nov. 19, 2011.
Jacobson, et al.; The Last Book, IBM Systems Journal, vol. 36, No. 3, 1997, pp. 457-463.
Proceedings of the Human Factors and Ergonomics society, 40th Annual Meeting, Human Centered Technology, Key to the Future, Philadelphia 1996, vol. 1, 10 pages.
Gonzales, Cesar A. (Guest Editor), Multimedia technologies in IBM: An overview of this issue IBM Journal of Research and Development, vol. 42, No. 43, vol. 4, 1999, pp. 450-617.
Dan, et al., Multimedia Systems, IBM Journal of Research and Development, vol. 42, No. 2, 1998, pp. 162-163.
Alt, et al., Increasing electronic display information content: An introduction, IBM Journal of Research and Development, vol. 42, No. 3/4, May/Jul. 1998, pp. 315-320.
Light Emitting Polymers Technology Backgrounder, Electronic Polymers, http:/laplace.ucv.cl/Charlas/OrganicLEDs/ CDLTLad/www.cdtltd.co.uk- . . . , 5 pages, retrieved from the Internet Nov. 18, 2011.
Carro, Light Pen to Use with a Transparent Electro-Luminiscent Display; www.IP.com; IPCOM000016405d, Nov. 30, 2002, 4 pages.
Scientists Develop New Material for Efficient Flat-Panel Displays, Princeton University News Release, Feb. 17, 2000, 2 pages.
Tang, Ching, Brightness on Display, OE Magazine, Feb. 2001, 6 pages.
Forrest, Stephen, The Dawn of Organic Electronics, IEEE Spectrum, Aug. 1, 2000, 10 pages.
High Resolution Displays, IBM Journal of Research and Development, vol. 42, No. 3/4, 1998.
Harding, Robert D., Computer Interactive Texts, Proceedings of the 4th Annual International Conference on Technology in Collegiate Mathematics, Portland, OR, Nov. 15-17, 1991 (published Addison-Wesley, 1993), pp. 132-138.
Tapponier, Axelle, Axelle's OLED page, Useful links about OLED, Last updated May 19, 2004, http:1164233.167.104/u/ethweb?q=cache . . . , 3 pages, retrieved from the Internet Jun. 10, 2004.
IBM/Ease of Use/What is a User Interface?, http://web.archive.org/web/20000301103545/http://www-3.ibm.com/ibm . . . , 1 page, retrieved from the Internet Nov. 21, 2011.

* cited by examiner

Active Regions Table
(304)

Doc: *071104*
Title: *"Atlas of Asia"*
Publisher: *GeoWorld Ltd.*
URL: *http://www.geoworld.com*

:
:

PAGE: *133*
RO: "Hong Kong"
  Government Information
    http://www.info.gov.hk/eindex.htm
  Facts About
    http://www.cia.gov/cia/publications/factbook/geos/hk.html
  Travel & City Guides
    http://www.inm-asiaguides.com/hongkong/ehkgintro.htm
  Lonely Planet Guide
    http://www.lonelyplanet.com/destinations/north_east_asia/hong_kong/

R1: "Hong Kong Island"
  All about Hong Kong Island
    http://www.discoverhongkong.com/eng/misc/ml_hkmp_hkis.jsp
  Hotels in Hong Kong Island
    http://www.asia-hotels.com/hi/Hong_Kong_Island-Hong_Kong.asp
  Photo Guide to Hong Kong
    http://www.photoguide.to/hongkong/city.html R2: "Aberdeen"
  Aberdeen & Stanley Guide
    http://www.inm-asiaguides.com/hongkong/ehkgsou.htm
  Kasbah.com Guide
    http://www.kasbah.com/highlights/china_hong_kong_aberdeen_harbour.htm R3: "New Territories"
  The New Territories Guide
    http://www.inm-asiaguides.com/hongkong/ehkgnt.htm
  All-Hotels Guide
    http://www.all-hotels.com/east_asia/china/hong_kong/new_territories_e1.htm

Fig. 7

Hyperlink data of selected point (1200)

DOC: 071104            PAGE: 133

R2: "Aberdeen"
 Aberdeen & Stanley Guide
   http://www.inm-asiaguides.com/hongkong/ehkasou.htm
 Kasbah.com Guide
   http://www.kasbah.com/highlights/china_hong_kong_aberdeen_harbour.htm

R1: "Hong Kong Island"
 All about Hong Kong Island
   http://www.discoverhongkong.com/eng/misc/mi_hkmp_hkis.jsp
 Hotels in Hong Kong Island
   http://www.asia-hotels.com/hl/Hong_Kong_Island-Hong_Kong.asp
 Photo Guide to Hong Kong
   http://www.photoguide.to/hongkong/city.html

R0: "Hong Kong"
 Government Information
   http://www.info.gov.hk/eindex.htm
 Facts About
   http://www.cia.gov/cia/publications/factbook/geos/hk.html
 Travel & City Guides
   http://www.inm-asiaguides.com/hongkong/ehkgintro.htm
 Lonely Planet Guide
   http://www.lonelyplanet.com/destinations/north_east_asia/hong_kong/

Fig. 12

METHOD AND SYSTEM FOR PROCESSING INFORMATION RELATING TO ACTIVE REGIONS OF A PAGE OF PHYSICAL DOCUMENT

This application is a continuation of Ser. No. 10/818,790, filed Apr. 6, 2004, now U.S. Pat. No. 7,310,779 B2, issued Dec. 18, 2007.

BACKGROUND OF THE INVENTION

The present invention relates to printed media documents with electronic links to related, electronic information.

Electronic publishing is well known today. An enormous amount of content, including documents, books and other types of publications are now accessible to users of personal computers or specialized e-book readers, via the WWW or CD ROM. Nevertheless, some people prefer the feeling and ease of reading a tangible newspaper, magazine or book.

Hyperlinks on web pages are well known today where a user can "click on" an icon, and in response, the web browser will fetch and display another web page linked to the icon. It was also known to define hyperlink active regions in a web page as rectangles, circles, and polygons, and associate them with a hyperlink address. They enable selected areas of a digital image (e.g., a GIF or JEPG image file) to be made "clickable" (i.e., active) so that a user can navigate from the web page containing the image to a number of other web pages or files, depending on which part of the image is selected. To create an imagemap, three things are required: an image, a database that relates each active region within the image to a hypertext reference, and a method of associating the database with the image.

US patent application 20020087598 entitled "Method and system for accessing interactive multimedia information or services by touching highlighted items on physical documents" was filed on Apr. 25, 2001 and published on Jul. 4, 2002. It discloses a system and method for manually selecting and electronically accessing multimedia information and/or services located on a user workstation or on one or a plurality of servers connected to a communication network. To make a selection, a person touches his or her finger to a word, letter, symbol, picture, icon, etc. that is electronically illuminated on the surface of a hard-copy document or any other physical surface. These illumination items are illuminated by a luminous signal (or light spot) generated by a transparent opto-touch foil, operating under the control of a user workstation. These illumination items act like hyperlinks. When the user selects one of the illuminated items, the user workstation receives from the opto-touch foil a signal indicating the position of the selected item. Then, the user workstation identifies and locates, by reference to a hyperlink table, the information and/or the service associated with the selected item. If the information and/or service is located in a remote server, the user workstation sends a request to this server for the information and/or service. If the information and/or the service is stored in the user workstation, then this information and/or service is accessed locally. The user workstation then displays the information or provides the requested service.

In US patent application 20020087598, the hyperlinked items are identified by the user as discrete illuminated points (light spots) emitted by the transparent opto-touch foil placed over the document. When the user touches the foil, a "minimum distance" algorithm is used to identify the hyperlink item selected by the user. According to the minimum distance algorithm, the distance from the coordinates of the point pressed by the user on the opto-touch foil is compared to the coordinates of all hyperlinked items (i.e., assimilated to illuminated points) defined on the document. The hyperlink item closest to the point that was pressed is the one deemed selected and triggered. Each hyperlink item (light spot) is a associated with a unique hyperlink destination (i.e., with a single URL) giving access to a single multimedia information or service related with the selected item.

The system disclosed in US patent application 20020087598 may have difficulty discriminating between touch points adjacent to closely spaced hyperlink items. Also, the appearance of the illuminated spots on the transparent foil over the document may mask, to some degree, the print seen by the user. Also, the use of a light spot as the hyperlink item does not always convey the subject matter of the hyperlinked information.

An object of the present invention is to create and utilize indicia of active regions on a printed document in such a way as to facilitate user selection of an active region.

Another object of the present invention is to create and utilize indicia of active regions on a printed document in such as a way as not to mask the document.

Another object of the present invention is to create and utilize indicia of active regions on a printed document in such a way as to more readily convey the subject matter of the hyperlinked information.

Another object of the present invention is to create and utilize indicia of active regions on a printed document in such as a way as to show the hyperlinked information related to an active region selected by the user.

SUMMARY OF THE INVENTION

The present invention resides in a system, method and program product for presenting and selecting an active region of a physical document page so that a user can access corresponding information via a workstation. A transparent electro-luminescent tablet or other touch sensitive plate is positioned over the physical document page. The tablet or plate is coupled to the workstation. The physical document page is identified to the workstation. The workstation stores information defining an active region for the physical document page and a hyperlink to a web page or web file containing information related to content of the active region. The workstation directs the tablet or plate to display the active region over the physical document page. A user touches a point within the active region. In response, the tablet or plate conveys the touch point to the workstation, and the workstation displays on a computer screen the hyperlink.

The invention also resides in a system, method and program product for presenting and selecting an active region of a physical document page so that a user can access corresponding information via a workstation. A transparent electro-luminescent tablet or other touch sensitive plate is positioned over the page. The tablet or plate is coupled to the workstation. The page is identified to the workstation. The workstation stores information defining an outline of the active region for the page and a hyperlink or information related to content of the active region. The workstation directs the tablet or plate to display the outline of the active region over the page. A user touches a point within the outline. In response, the tablet or plate conveys the touch point to the workstation, and the workstation displays on a computer screen the information related to the content of the active region.

The invention also resides in a system, method and program product for presenting and simultaneously selecting first and second active regions of a physical document page so that a user can access corresponding information via a workstation. A transparent electro-luminescent tablet or other touch sensitive plate is positioned over the page. The tablet or plate is coupled to the workstation. The page is identified to the workstation. The workstation stores information defining outlines of the first and second active regions for the page and first and second hyperlinks or first and second documents related to contents of the first and second active regions, respectively. The outline for the second active region encompasses the outline for the first active region. The workstation directs the tablet or plate to display the outlines of the first and second active regions over the page. A user touches a point within the outline of the first active region. In response, the tablet or plate conveys the touch point to the workstation, and the workstation displays on a computer screen the first and second hyperlinks or the first and second documents related to the contents of the first and second active regions.

BRIEF DESCRIPTION OF THE FIGURES

FIG. 7 shows a table within the system of FIG. 2 used to define hyperlinks corresponding to active regions.

FIG. 12 illustrates a stage in the use of the system of FIG. 2 where multiple, hyperlink information corresponding to the single touch point of FIG. 11 (and more than one active region that enclose and are invoked by that touch point) are retrieved and displayed to the user on the user computer.

DETAILED DESCRIPTION OF THE PREFERRED EMBODIMENT

Figure 1:
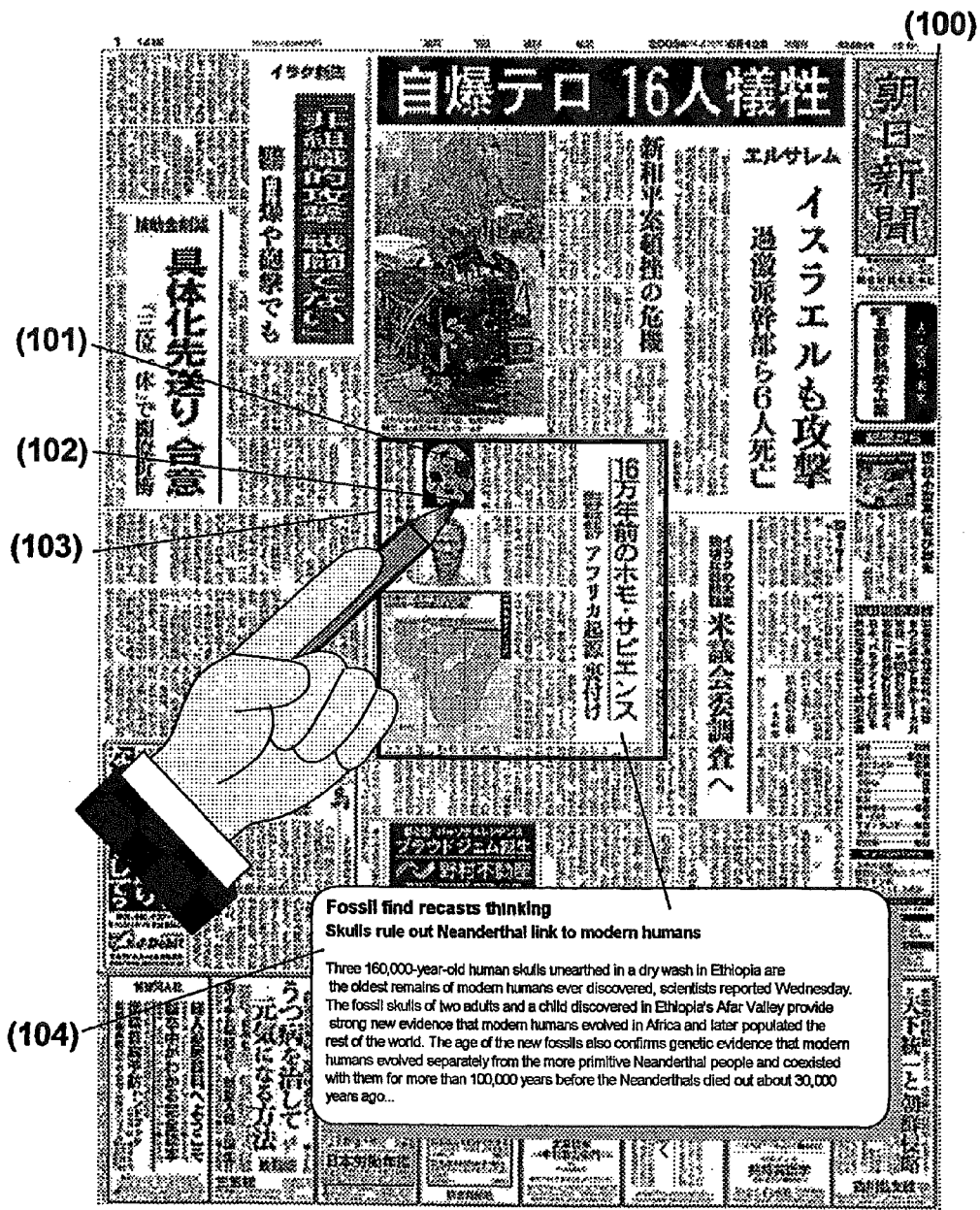
FIG. 1 illustrates a physical document where an active region has been defined according to the present invention, and also illustrates related hyperlinked information appearing on a user computer display.

FIG. 1 illustrates how the present invention is used to provide additional information or a translation for a foreign language newspaper 100. The user places an Electro-luminescent display tablet ("ELDT") over a page of the newspaper or other document of interest. Then, the user identifies the document to a user workstation. In response, the user workstation directs the ELDT to display/illuminate a perimeter of an active region 103 on the document. Then, the user touches a printed item 101 within the active region 103 with a stylus 102 in order to receive additional information about the content within the active region. In response, the user workstation 203 automatically displays an English translation 104 of the text printed in the highlighted region. (Alternately, an English translation can be read by a text-to-speech conversion system.) Alternately, in response to the user touching the identified item 101, the user workstation may display one or more hyperlinks to web pages or other documents or applications related to the subject of the selected item. A short summary of each hyperlink may be displayed adjacent to each hyperlink to advise the user what further information the hyperlink will elicit. If the user selects one of the hyperlinks using a mouse or keyboard, the user workstation will display the associated web page or other information.

Figure 2:
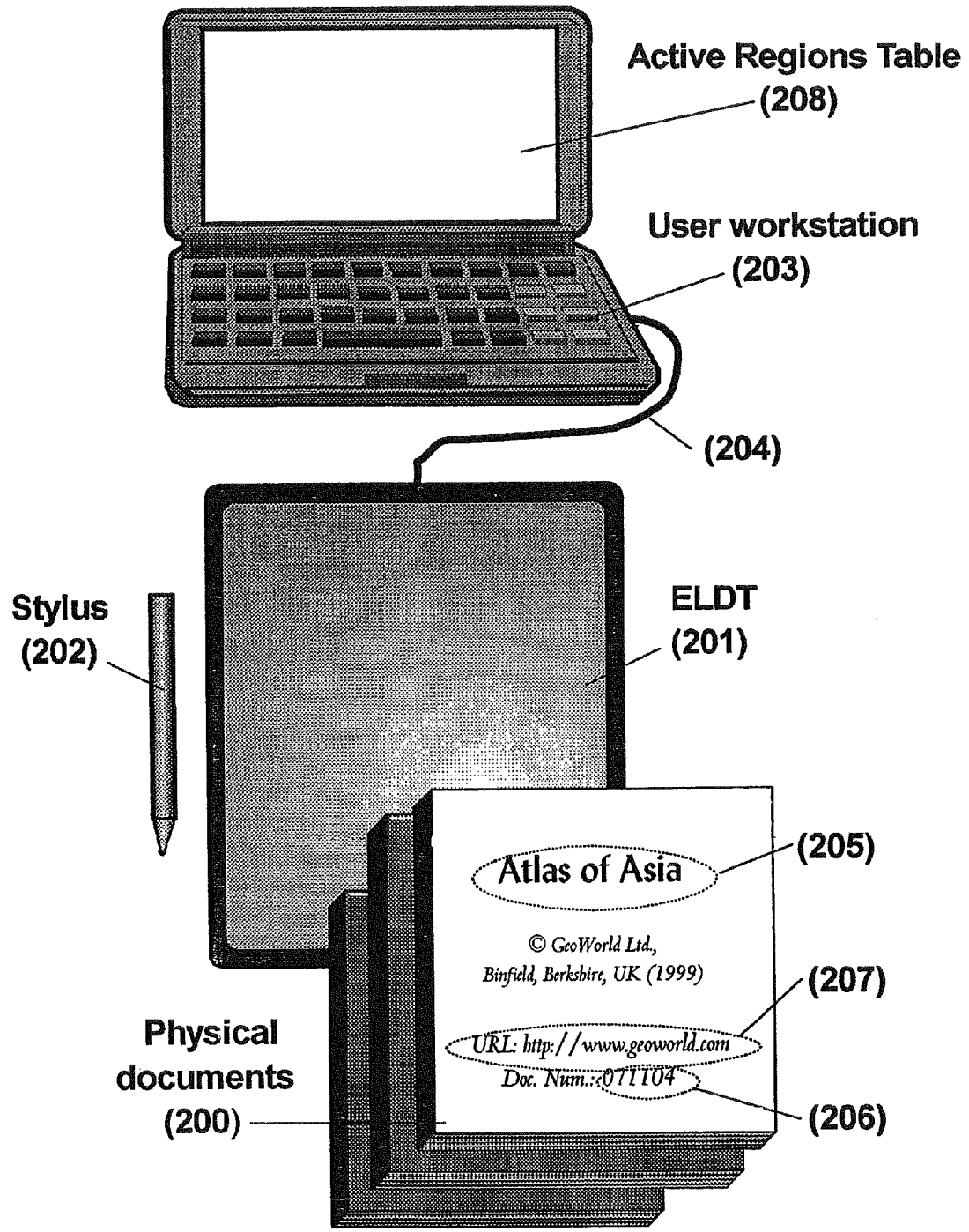
FIG. 2 illustrates a system, according to the presend invention, used to create, display and use active regions on a physical document.

FIG. 2 illustrates the main components of the present invention and their operation. Physical documents 200 can be of any kind, for example, newspapers, legal documents, maps (e.g., topographical maps, political maps, historical maps, route maps, shaded relief maps, city maps, natural resources maps, rail road maps or other type of map), fiction novels, academic text books, technical books, commercial catalogs or other type of engraved, written, or printed surface.) The document can be made of paper, plastic, wood or any other material. For identifying a selected document 200 to the system, the title 205, a numerical reference 206 (e.g., the ISBN number, or any other number assigned by the publisher or the user), or even the URL (i.e., the internet address) 207 of the publisher server may be printed, written or attached on the physical document (e.g., on the front cover, back cover or first page).

Figure 15:
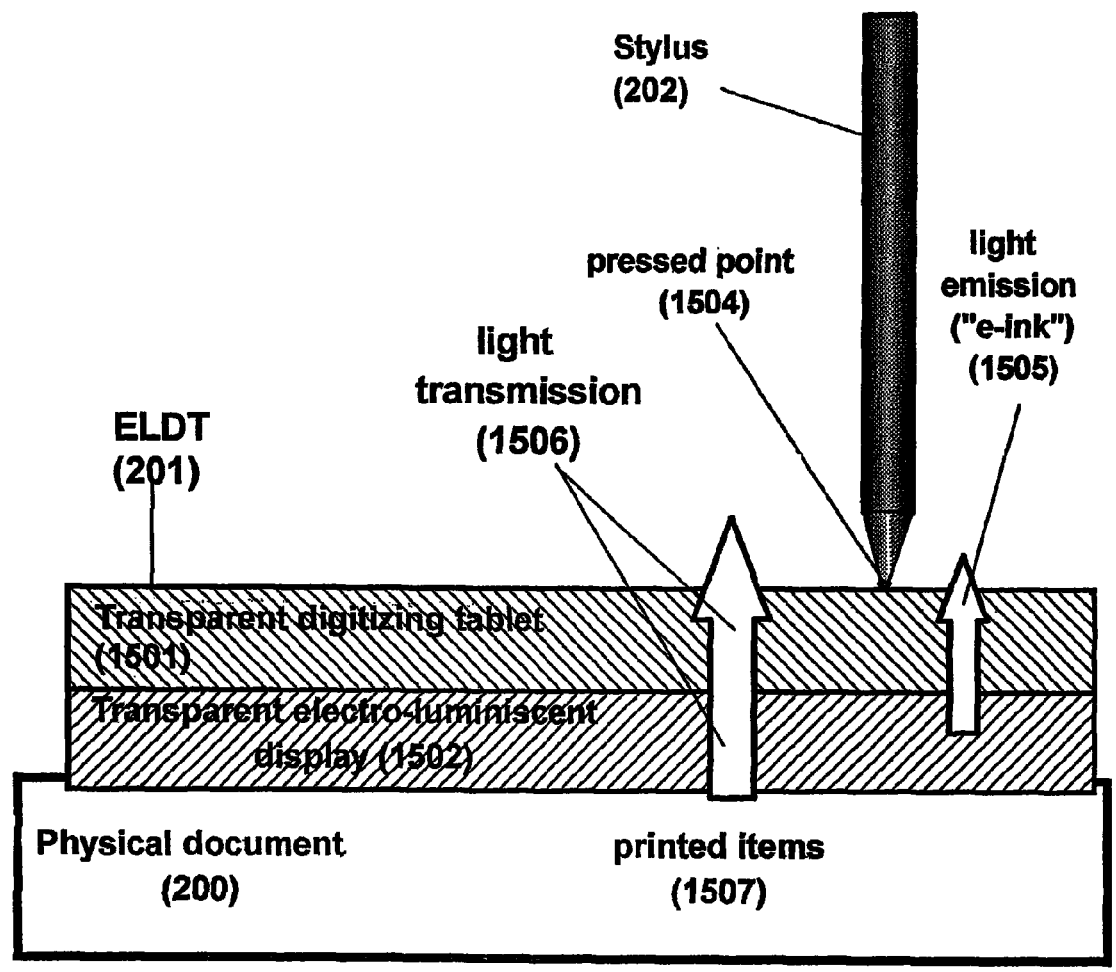
FIG. 15 illustrates the internal structure of an electro-luminescent digitizing tablet (ELDT) which overlays the printed document within the system of FIG. 2.

As shown in FIG. 15, the electro-luminescent digitizing tablet (ELDT) 201 comprises two superposed, functionally independent transparent foils 1501 and 1502. Transparent digitizing tablet (DT) 1501 can be a type used commonly to manufacture position sensible liquid crystal display devices (PSLCDs) for computers. The generated signals are generally proportional to the coordinates of the point that is pressed 1504 by the stylus 202. Transparent electro-luminescent display (EL) 1502 can be a transparent, bright, self-emitting display that can emit light 1505 from either one or both surfaces. The combination of both foils (i.e., the digitizing tablet 1501 stacked over the electro-luminescent display 1502) forms electro-luminescent digitizing tablet (ELDT) 201.

FIG. 15 illustrates an ELDT placed and aligned over a physical document 200 comprising a plurality of items 1507 (i.e., words, paragraphs, sections, pictures, icons, etc.) printed (or written, painted, engraved . . . ) on the surface of the document 200. FIG. 15 also illustrates how the electro-luminescent display 1502 emits light 1505 illuminating and defining polygonal or circular perimeters defining the active regions of a printed document. This occurs when a user draws them with the stylus 202 and subsequently, when the user selects them. The portions of the ELDT other than those displaying the active region perimeters allow light 1506 from the document 200 to pass through both transparent foils 1501 and 1502 to the reader, so that the surface of the physical document is fully visible except for underneath the thin luminous lines delimiting active regions.

Referring again to FIG. 2, the ELDT 201 may communicate with the user workstation 203 over an infrared link, a serial wired connection or any other communication means (e.g. by means of a wireless connection operating in the globally available 2.4 Ghz band of the "Bluetooth" specification, as promoted by the "Bluetooth Special Interest Group" and documented on the Official Bluetooth Website. This connection, wired or wireless, is represented by the reference number 204.

Known transparent digitizing tablets are produced, for example, by Calcomp corporation and Wacom Technology Company. One example of a transparent digitizing tablety that can be used for ELDT 201 is WACOM PL Series, LCD pen tablet systems.

The transparent electro-luminescent display 1502 may include a substrate having an array formed by a plurality of transparent scanning lines, transparent data lines crossing said scanning lines, and electro-luminescent (EL) elements (pixels) on the intersections of the scanning and data lines. The lines are used to determine the position of an applied stylus. Those transparent lines and contacts are made by a transparent conductive material, e.g., indium tin oxide (ITO). When integrated on top of a display surface, a transparent digitizing tablet is actually a layer that has a mesh of transparent wire sensors running through it. This mesh may look like moiree patterns on the top of the display. These thin wires, when acted upon by a moving stylus, report the sequence of contact points. The movement of a pencil-like stylus over a tablet surface re-creates the drawing on a computer screen.

With today's technology, this passive-matrix, light-emitting display may be made of an array of TOLED's (Transparent Organic Light Emitting Devices) of the types used to create vision area displays on windshields, cockpits, helmets and eyeglasses. In its most basic form, a TOLED is a monolithic, solid-state device consisting of a series of "small molecule" organic thin films sandwiched between two transparent, conductive layers. When a voltage is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light. As a result, TOLEDs are bright, self-emitting displays that can be directed to emit from either or both surfaces. This is possible because, in addition to having transparent contacts, the organic materials are also transparent over their own emission spectrum and throughout most of the visible spectrum.

TOLED displays are today manufactured with standard silicon semiconductors. Since TOLEDs are thin-film, solid-state devices, they are very thin, lightweight and durable, ideal for portable applications, like the present invention. TOLEDs can be bottom, top, or both bottom and top emitting. Also, TOLEDs technology has attractive advantages regarding, transparency (TOLED displays can be nearly as clear as the glass or substrate they are on and when built between glass plates, TOLEDs are >85% transparent when turned off), energy efficiency (for longer battery life), full viewing angle, bright and high contrast light emission, fast response time, and environmental robustness. Thus, TOLEDs are well suited for manufacturing the light-emitting, electro-luminescent, display component, used jointly with the transparent digitizing tablet for the present invention. One example of light emitting foil technology that may be used is that of the TOLEDs manufactured by UNIVERSAL DISPLAY CORPORATION.

Pen like stylus 202 is a type commonly used as input devices for data processing and storage systems in place of conventional keyboards and mouse devices. The stylus 202 is used in combination with the digitizing tablet 1201 component of the ELDT 201 incorporating a resistive or capacitive digitizer or sheet material. As such, information can be input by writing with the stylus on the ELDT device. The electro-luminescent 1502 component of the ELDT displays the instantaneous position and path of movement of the stylus. In this way, the ELDT device displays the pattern, e.g. a written message, sketch or signature traced thereon. In the present invention, a human uses the stylus 202 to draw active regions via the ELDT. Subsequently, a human uses the stylus 202 to select a portion of document content seen through the transparent ELDT device 201. If that portion is within an active region, then the ELDT notifies the workstation 203 of the selection. One example of stylus 202 is a known wireless, pressure sensitive Wacom UltraPen (tm of Wacom Technology Company) stulus.

The user workstation 203 can be a handheld device, such as a PDA or a cell phone, a personal computer, a network computer, an Internet appliance or a wireless IP enabled device, connected to the ELDT 201. The user workstation 203 can be stand-alone or connected to a network (e.g. the Internet). User workstation 203 includes a wired, wireless or other connection 204 for connecting to the ELDT device 201 to transfer the information necessary to create active regions of physical documents, or to receive through a network and store active regions of a plurality of physical documents. The user workstation receives the coordinates of the points selected by the user with the stylus on the physical document 200 to select active regions detected by the ELDT device 201.

Figure 18:
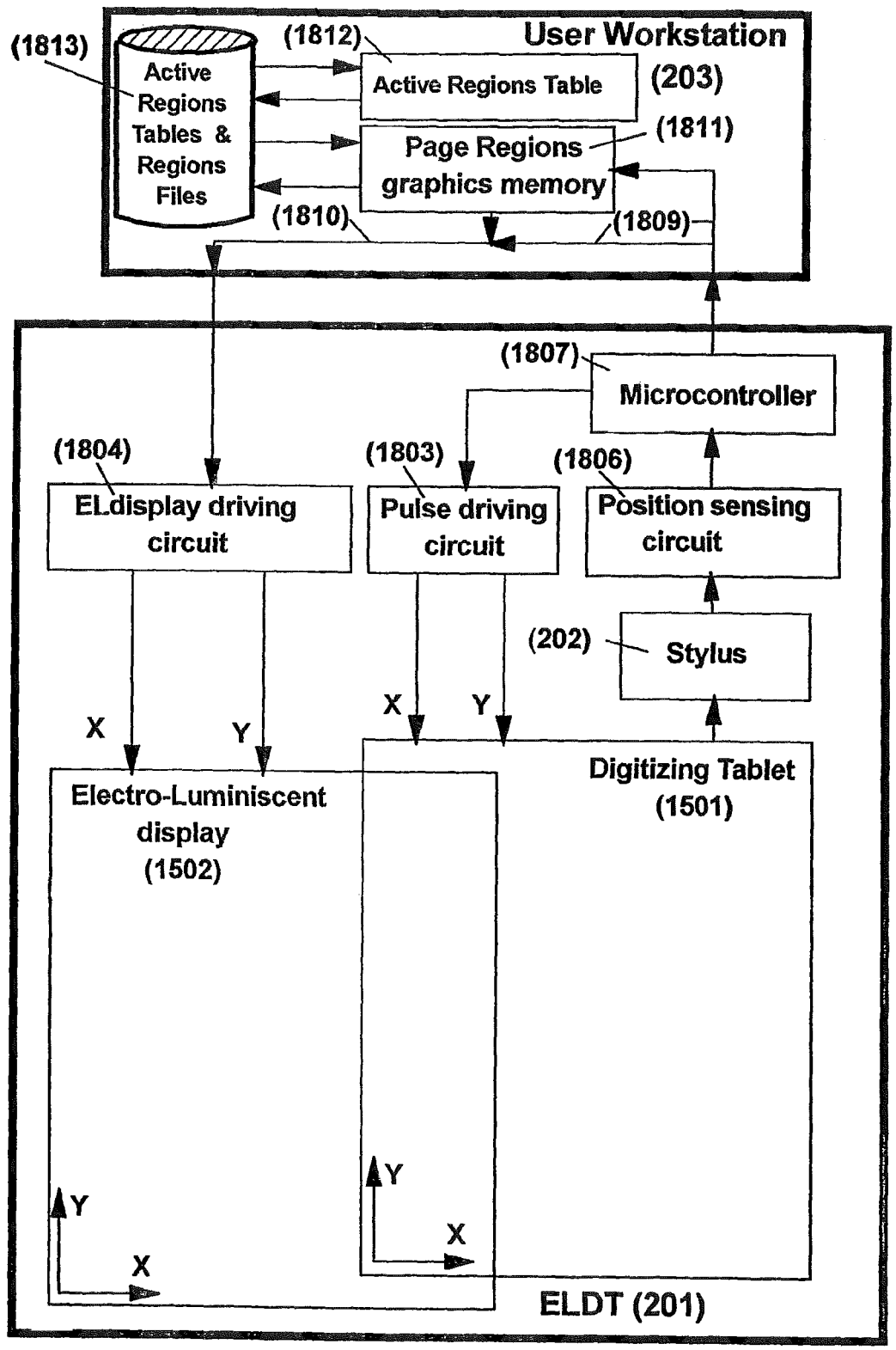
FIG. 18 illustrates the components within the user computer and ELDT of the system of FIG. 2.

The components and operation of an embodiment of the present invention are now described with reference to FIG. 18. A pulse driving circuit 1803 alternately transmits driving pulses to X-axis and Y-axis directions of the digitizing tablet 1201 for sensing the present position of the stylus 202. The position of stylus 202 is detected by capacitive coupling sensed in the digitizing tablet 1201. The stylus 202 senses a position signal in a potential distribution on the digitizing tablet 1201 using capacitive coupling and provides the position signal to the position sensing circuit 1806. The position sensing circuit 1806 receives the present X-axis and Y-axis coordinate data of the stylus and converts the coordinate data into digitized position data. The microcontroller 1807 controls the pulse driving circuit 1803 and also transfers data of the position detected from the position sensing circuit 1806 to the user workstation 203. Upon reception of the position data from position sensing circuit 1806, the microcontroller 1807 analyses the position data to calculate the present position of the stylus 202 and updates the user workstation 203 accordingly.

The user workstation 203 controls the EL display driving circuit 1804, while the EL display driving circuit 1804 provides X-axis and Y-axis coordinates driving signals to the electro-luminescent display 1502 so that it can display the pixel on which the stylus is placed. Alternatively, during monitoring of active regions previously defined, X-axis and Y-axis coordinates of the points (pixels) defining active regions geometric data, are fetched from referenced physical page data on Active Regions Table 1812 and are loaded on the Page Regions graphics memory 1811 (a graphics buffer for all regions defined to be active on a document's page). The EL display driving circuit 1804 retrieves from Page Regions graphics memory 1811 the coordinates of those pixels of the active regions to be draw and transforms those coordinates to driving signals sent to the electro-luminescent display 1502.

Figure 16:
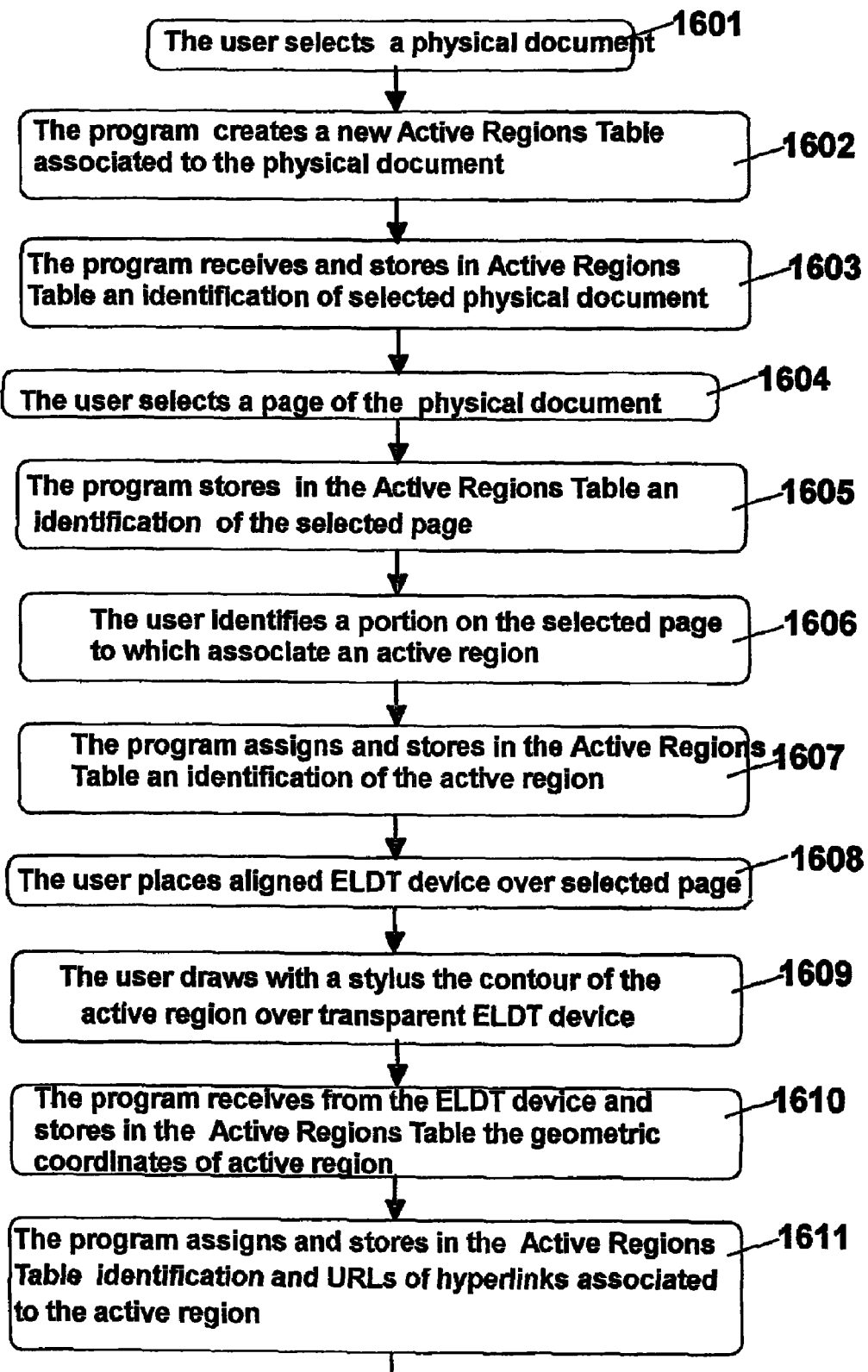
FIG. 16 is a flow chart illustrating the steps in creating active regions on a physical document within the system of FIG. 2.

FIG. 16 illustrates the steps for creating active regions (imagemaps) on portions of physical documents and associating hyperlinks from the active regions to multimedia information or services. In step 1601, a user selects a physical document and identifies it to the user workstation 203. The physical document comprises one or multiple pages. In response to the selection of the physical document, a document management program within user workstation 203 initiates an Active Regions Table associated with the physical document (step 1602). The document management program records in the Active Regions Table an identification of the selected physical document (step 1603). Next, a user selects a page of the physical document and identifies the page to the document management program (step 1604). The document management program then records the page in the Active Regions Table for this document (step 1605). Next, the user identifies to the document management program names of portions of the page which will correspond to active regions subsequently identified by the user. (step 1606).

The following steps 1607-1611 are performed for each active region defined by the user. The document management program assigns and stores an identifier of the active region in the Active Regions Table (step 1607). Next, the user places and aligns a transparent ELDT device over the selected page of the physical document (step 1608). Next, the user draws with the stylus the contour of the active region over a transparent ELDT device or otherwise defines the outline of the active region by specifying the junction points of the polygon or shape and size of the circle (step 1609). The active region is defined in terms of rectangles, circles or polygons. Next, the document management program receives from the ELDT device and stores in the Active Regions Table geometric coordinates of the outline of the active region (step 1610). Next, the user specifies to the document management program one or more hyperlinks for each of the active regions defined by the user (step 1611) and the document management program stores this information in the Active Region Table.

Figure 3:
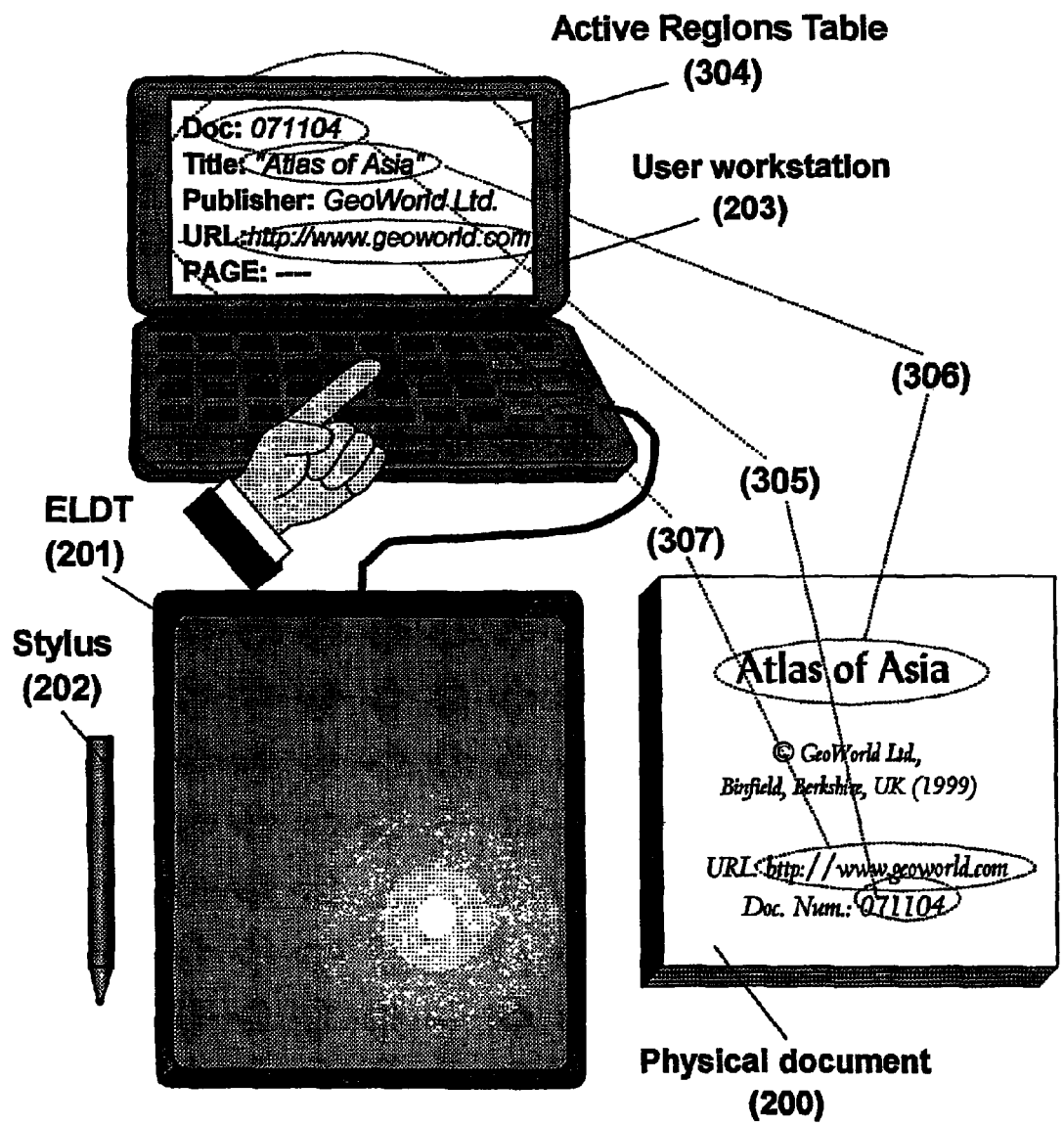
FIG. 3 illustrates a stage in use of the system of FIG. 2.

FIG. 3 illustrates the foregoing process in more detail. The user opens on the user workstation 203 an Active Regions Table 304 for the selected document 200 and enters via the keyboard or mouse codes or names for identifying the document. For example, the user types in corresponding fields in the Active Regions Table 304, the physical document reference number or ISBN (e.g., "071104" ) 305, the document title (e.g., *"Atlas of Asia"*) 306; the publisher's name (e.g., "GeoWorld Ltd.") and the internet address 307 of the publisher Web server. It should be noted that active regions can defined by both final users (e.g. readers) as well as editors or publishers of the physical documents. In the former case, the Active Regions Table may be stored on the user's workstation. In the latter case, the publisher may create the Active Regions Table for a published document and store it on a publisher's Web server for distribution to final users. From those publisher's servers, final users (i.e., readers) can select and download the Active Regions Tables of published documents to the user's workstations.

The URL 306 of the Publisher Server and the document reference number 307, used to identify the document and locate the electronic document copy through the Web, must be printed or attached at a predefined reserved place on the physical document 201 (e.g., on the front cover, back cover or first page). For each selection made by the user from a physical document 201 a new entry must be created on the Selections Table 305.

Figure 4:
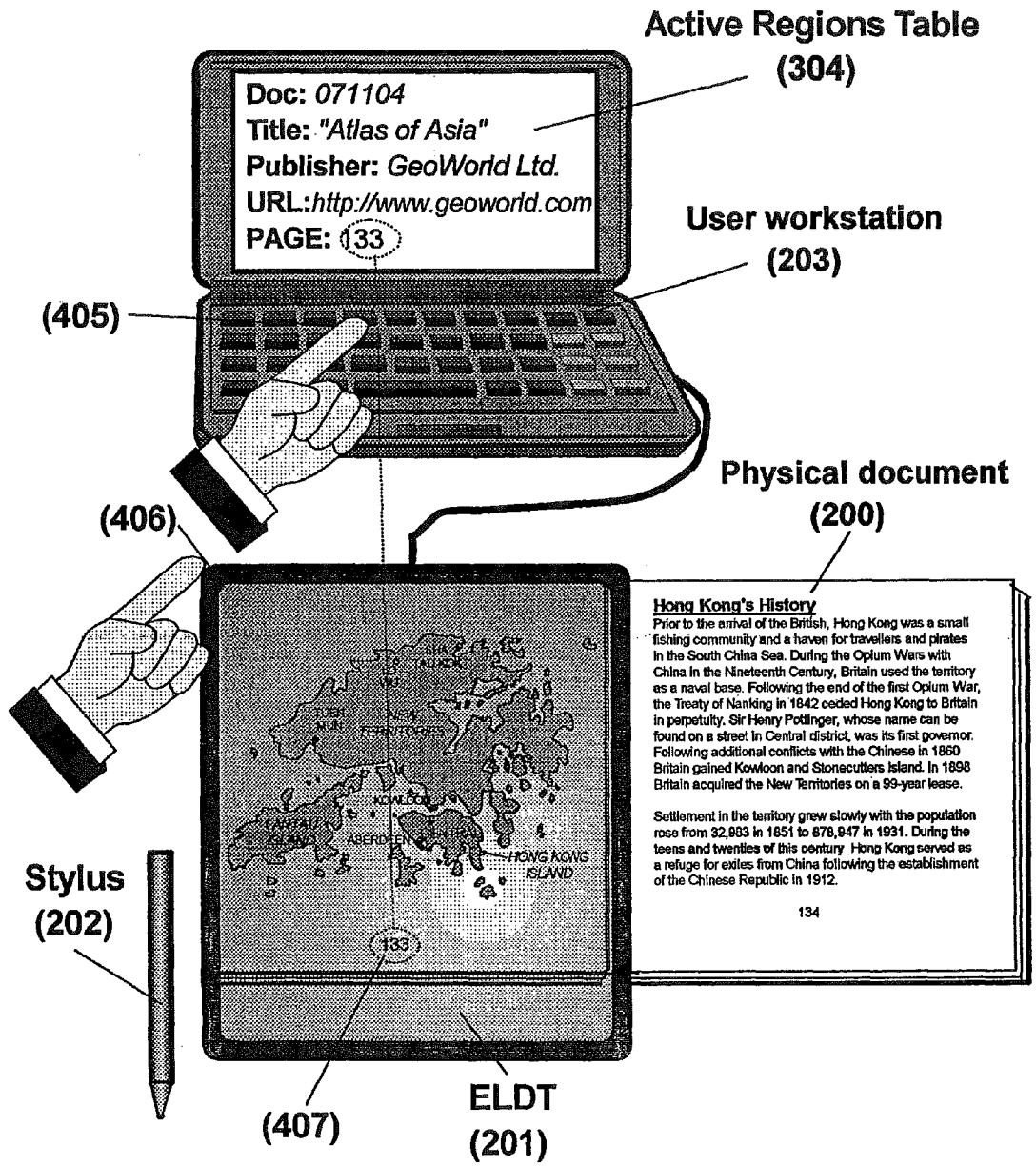
FIG. 4 illustrates a stage in use of the system of FIG. 2 when creating active regions on a physical document, the system is used to enter the page number on a user workstation.

FIG. 4 shows how the user (the publisher or the editor) while browsing or composing a physical document (e.g., an *"Atlas of Asia"*) 200 finds on a page (e.g. "Page 133") portions of printed content (e.g., cities and islands on "Hong Kong" map) representing interesting topics, to which he or she would like to associate links to related multimedia information or services. As represented in this figure, to create active regions from selected portions of this page, the user first identifies in the Active Regions Table 304 the selected page of physical document 200 by typing 405 the Page Number (e.g., page "133") on the user workstation 203. The selected Page Number is recorded on the Active Regions Table 304, associated to the selected document identification.

After entering on the user workstation 203 the number of the selected page, the following is done with the transparent ELDT device 201 to define active regions on this page. The user places the ELDT device 201 over the page and aligns 406 the ELDT device 201 with the borders of the page by some conventional means (e.g., by adjusting the upper left corner of the ELDT device with the upper left corner of the page). The user can still see the contents of the selected document's page through transparent ELDT device.

Figure 5:
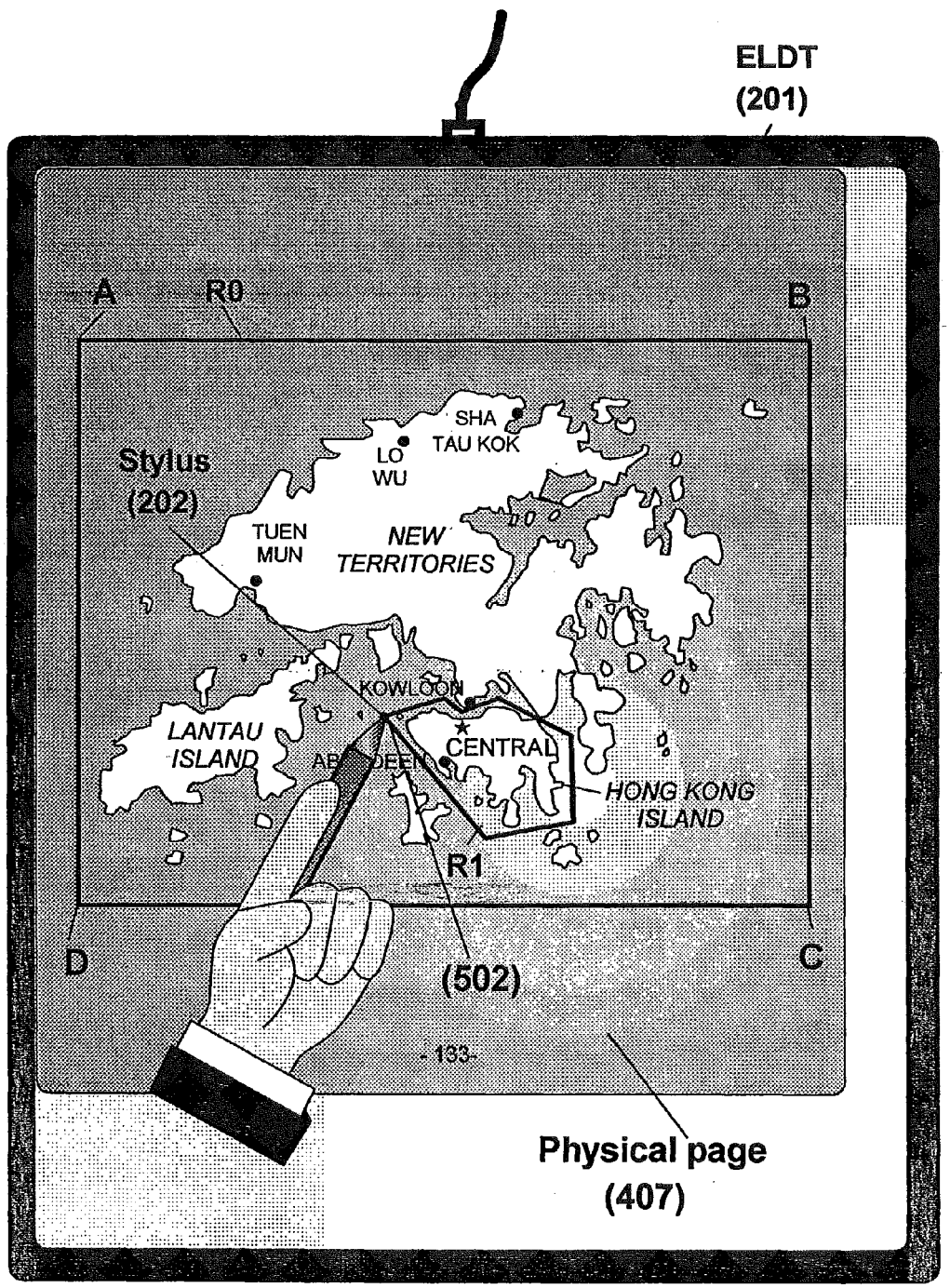
FIG. 5 illustrates how the system of FIG. 2 is used to create active regions on a transparent ELDT device.

FIG. 5 illustrates how to create active regions on a page 407 of a physical document after transparent ELDT device 201 is placed and aligned over the physical page. The user draws/traces by means of stylus 202 active regions over the transparent ELDT device. The shapes of the active regions are predefined, menu selectable geometric forms, such as circles, rectangles or polygons. They are draw or located by the user to enclose the portions of document content which the user wants to become selectable (i.e., active, selectable, or "clickable"). FIG. 5 illustrates how the user chooses to define active regions comprising rectangles (e.g., R0) and polygons (e.g., R1) enclosing selected geographic regions represented on a map (e.g., on "Hong Kong" physical map). In the example shown in this figure, this operation can be done for each active region, by the user selecting the options "RECTANGULAR REGION", or "POLYGONAL REGION" on the user workstation. Then, the user, keeping the transparent ELDT device 201 aligned over the selected page 407, draws or specifies by means of the stylus 202 the selected region (e.g., R0) by marking the corners (e.g., "A", "B", "C", "D"), defining the contour around it (or, as is the case of a rectangular region, by marking two points, i.e., the upper left corner "A", and the lower right corner "D"). Coordinates of the vertices (e.g., "A", "B", "C", "D") of the region (e.g., R0) are sensed by the ELDT device 201 and are transmitted to the user workstation 203 where they are recorded on a new entry created on the Active Regions Table 304 for the new active region. This new active region entry is associated with the selected document and page identification. Geometric parameters defining rectangular, polygonal or circular regions are stored on the Active Regions Table 304. Internally, a pointer is created from the entry corresponding to the active region being defined and the geometry shape parameters and coordinates received from the ELDT device determining the shape and location of said active region on the physical page (e.g. Rectangular region R0 would be defined as RECTANGLE: (Xa,Ya),(Xd,Yd); where (Xa, Ya) are the coordinates of the upper left corner "A", and (Xd, Yd) are the coordinates of lower right corner "D" of this rectangular region. As active regions are being drawn by the user, they are highlighted by the transparent ELDT device, while the user views the page of the physical document placed underneath. In one other embodiment of the present invention, the active regions can be created by software by processing active regions already created by an electronic mapping of the printed document page.

Active regions can be nested so that one can be included in another, or even overlap, so that multiple regions can share common portions of document content.

Figure 6:
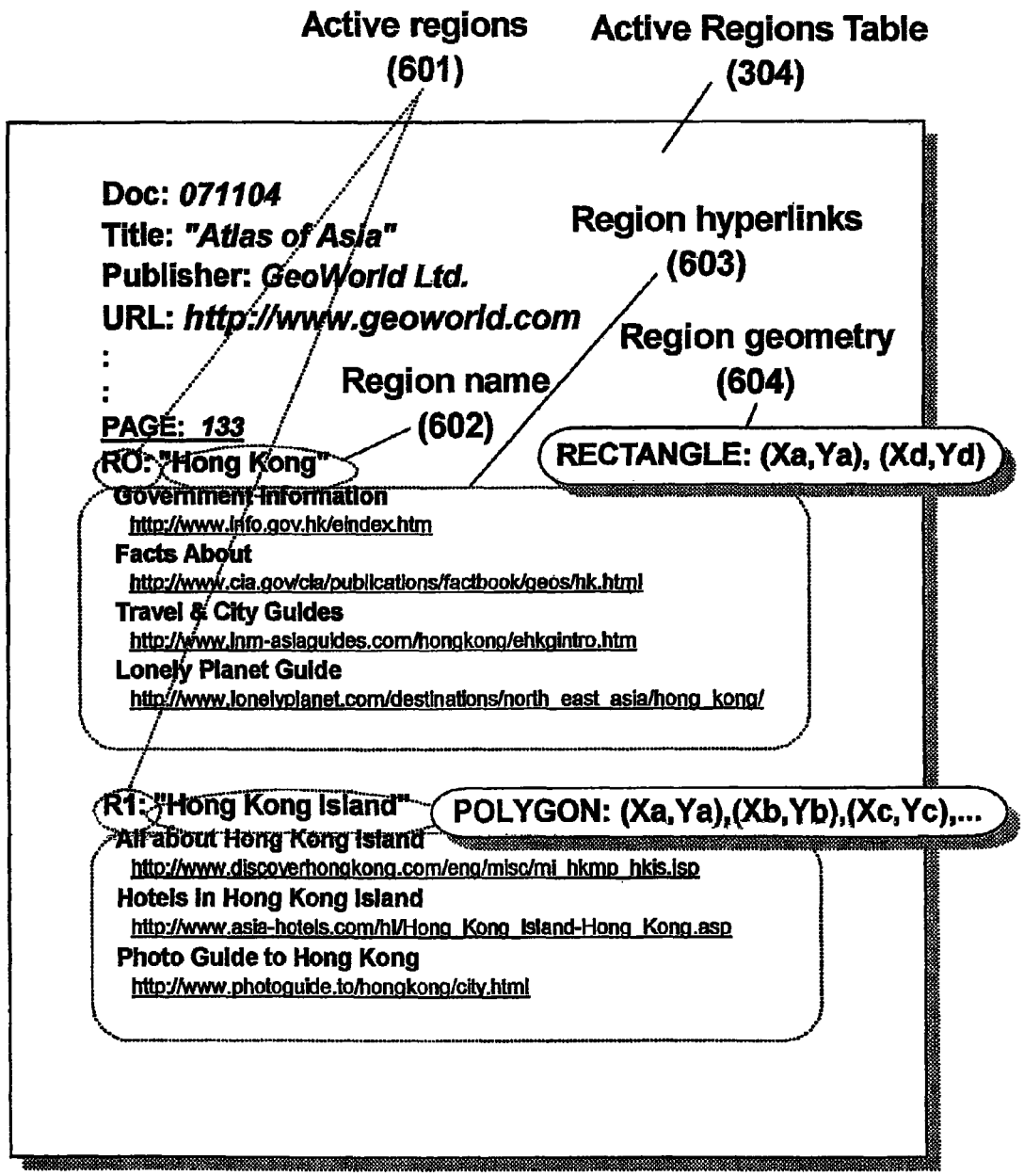
FIG. 6 illustrates how the system of FIG. 2 is used to associate an active region with at least one hyperlink.

FIG. 6 illustrates how the user associates one or a plurality of hyperlinks to active regions which have been created. For each active region (e.g., R0, R1) that the user draws with the stylus over the ELDT device 201 and the selected physical page 407 the user assigns on the corresponding active region entry 601 created on the Active Regions Table 304 on the user workstation 203, an active region name (e.g., "*Hong Kong*", "*Hong Kong Island*") 602 and one or a plurality of hyperlinks (comprising hyperlinks names, and URLs) 603. The hyperlinks link to hypermedia information or services to be accessed, or textual comments or data related to the regions to be displayed, when the user selects the corresponding active regions. For each active region (e.g., R0, R1) 601 on the Active Regions Table 304 internally there is a pointer to the geometric parameters and coordinates (e.g., RECTANGLE: (Xa,Ya),(Xd,Yd)) 604 specifying the shape and location of said active region on the physical page.

FIG. 7 shows an example of the information on the Active Regions Table 304 corresponding to the active regions (e.g., R0: "*Hong Kong*", R1: "*Hong Kong Island*", R2: "*Aberdeen*", R3: "*New Territories*") created on a page (e.g. "Page 133") of a physical document (e.g., an "*Atlas of Asia*"). A plurality of hyperlinks have been associated with each active region. Thus, the user can access different multimedia information or services from each active region.

Figure 8:
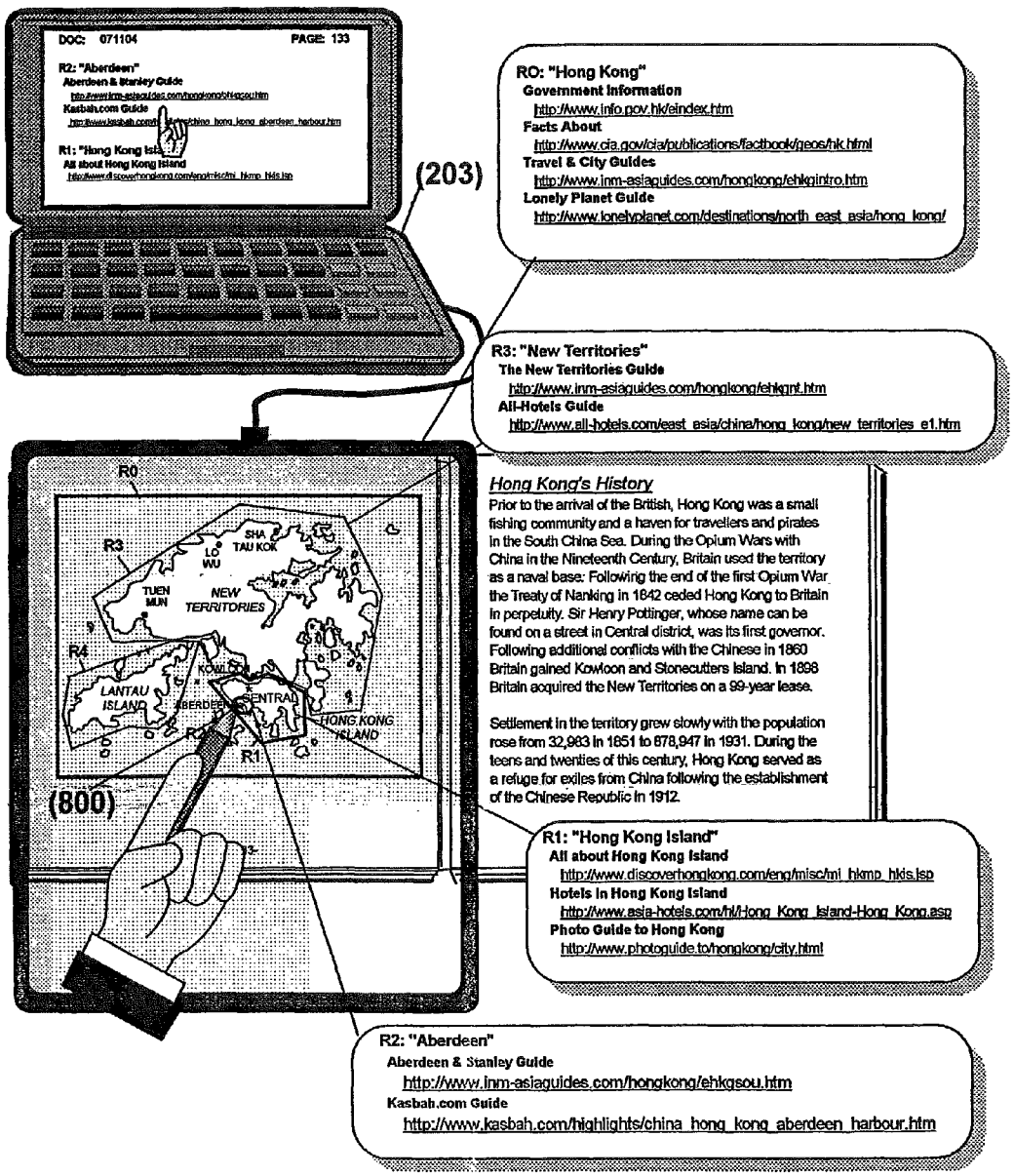
FIG. 8 shows relationships between active regions defined on a page of a physical document and the corresponding hyperlinks.

FIG. 8 illustrates the relationship between active regions (e.g., R0, R1, R2, R3) defined on a page of a physical document and the associated reference and hyperlink information on the Active Regions Table. This figure illustrates also another principle of the present invention. When the user selects a point 800 on a physical document, the hyperlink data (stored on the Active Regions Table) of all active regions enclosing the selected point (e.g., R2, R1, R0) is displayed to the user on the user workstation 203. In the example illustrated in FIGS. 8 and 10, there are three outlines R0, R1 and R2 which surround/encompass the touch point 800. So, when the user touches point 800, the hyperlinks for all three active regions R0, R1 and R2 are displayed on the user workstation. Then, the user can select any or all of these hyperlinks to see the corresponding web pages on user workstation 203.

Figure 17:
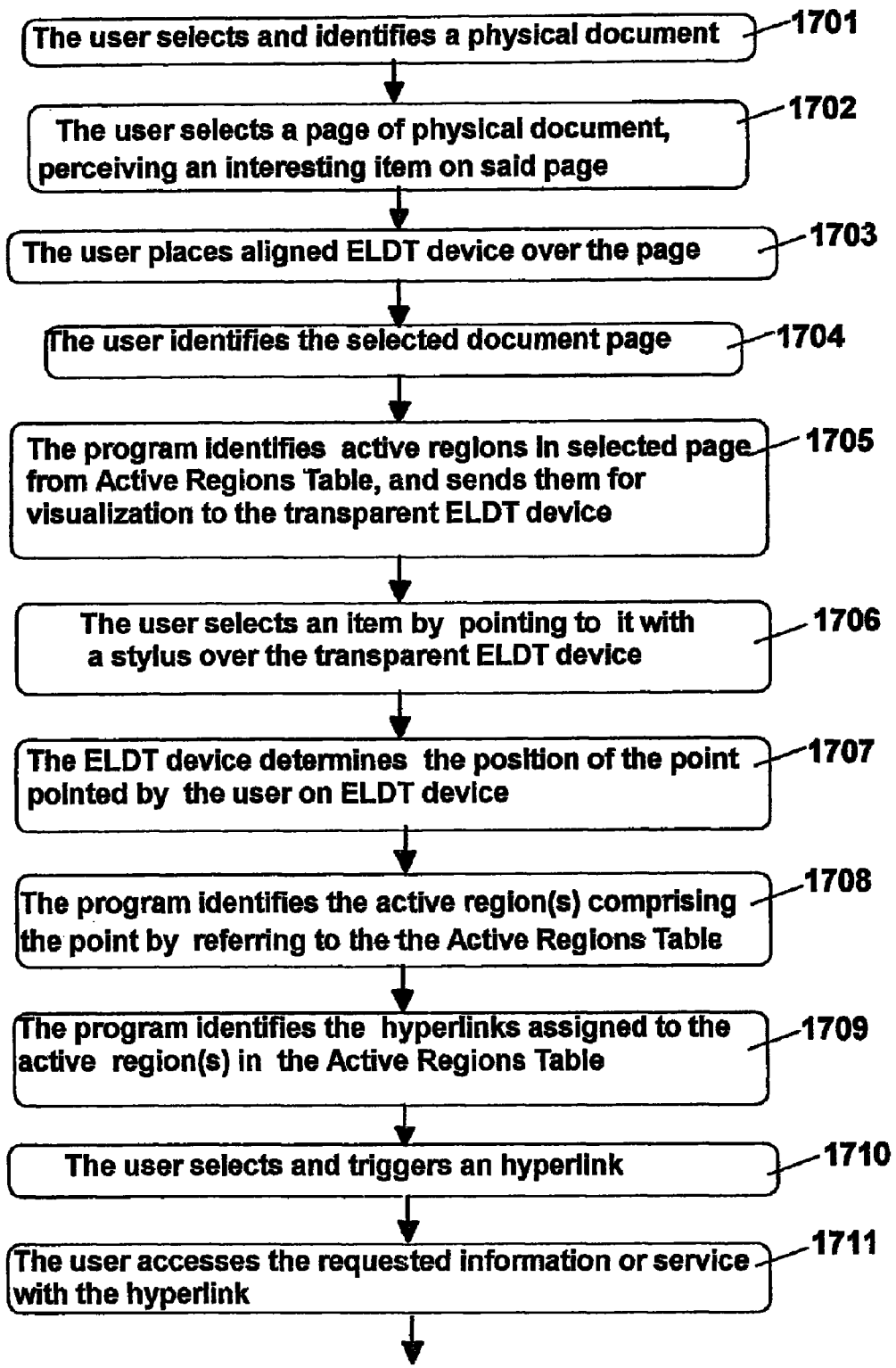
FIG. 17 is a flow chart illustrating the steps in using the active regions created in FIG. 16.

FIG. 17 illustrates the steps and programming by which a user can use the present invention to obtain more information about a topic in a physical document, after the active regions were defined as described above with reference to FIG. 15. A user selects and identifies to the user workstation 203 a physical document (step 1701). The physical document comprises one or a plurality of pages. A user selects a page of the physical document (step 1702) for which the user would like additional information. Then, the user places and aligns a transparent ELDT device over the selected page (step 1703). The ELDT device is connected to the workstation 203. Next, the user identifies the selected page to the user workstation (step 1704). The page comprises one or a plurality of active regions defined earlier. The document management program within workstation 203, based on the page's Active Regions Table identifies active regions within the identified page (step 1705) and directs the ELDT to display their geometric outlines. Next, the user selects an active region using the stylus (step 1706). Next, the ELDT determines the position of the stylus on said transparent ELDT device and conveys the touch position coordinates to the document management program (step 1707). Next, the document management program, by reference to the Active Regions Table, identifies the active region (or plurality of active regions that encompass the touch point) corresponding to the stylus position on said transparent ELDT device (step 1708). Next, by reference to the Active Regions Table, the document management program identifies hyperlinks defined for the active region (or plurality of active regions that encompass the touch point) (step 1709). As explained above, the Active Regions Table includes for each active region, an identification of the respective hyperlinks and the location of associated hyperlinked information or service. Next, the user selects one of the hyperlinks corresponding to selected active region (or plurality of selected active regions) (step 1710). In response, the workstation 203 accesses the information or service associated with the selected hyperlink (step 1711).

Figure 9:
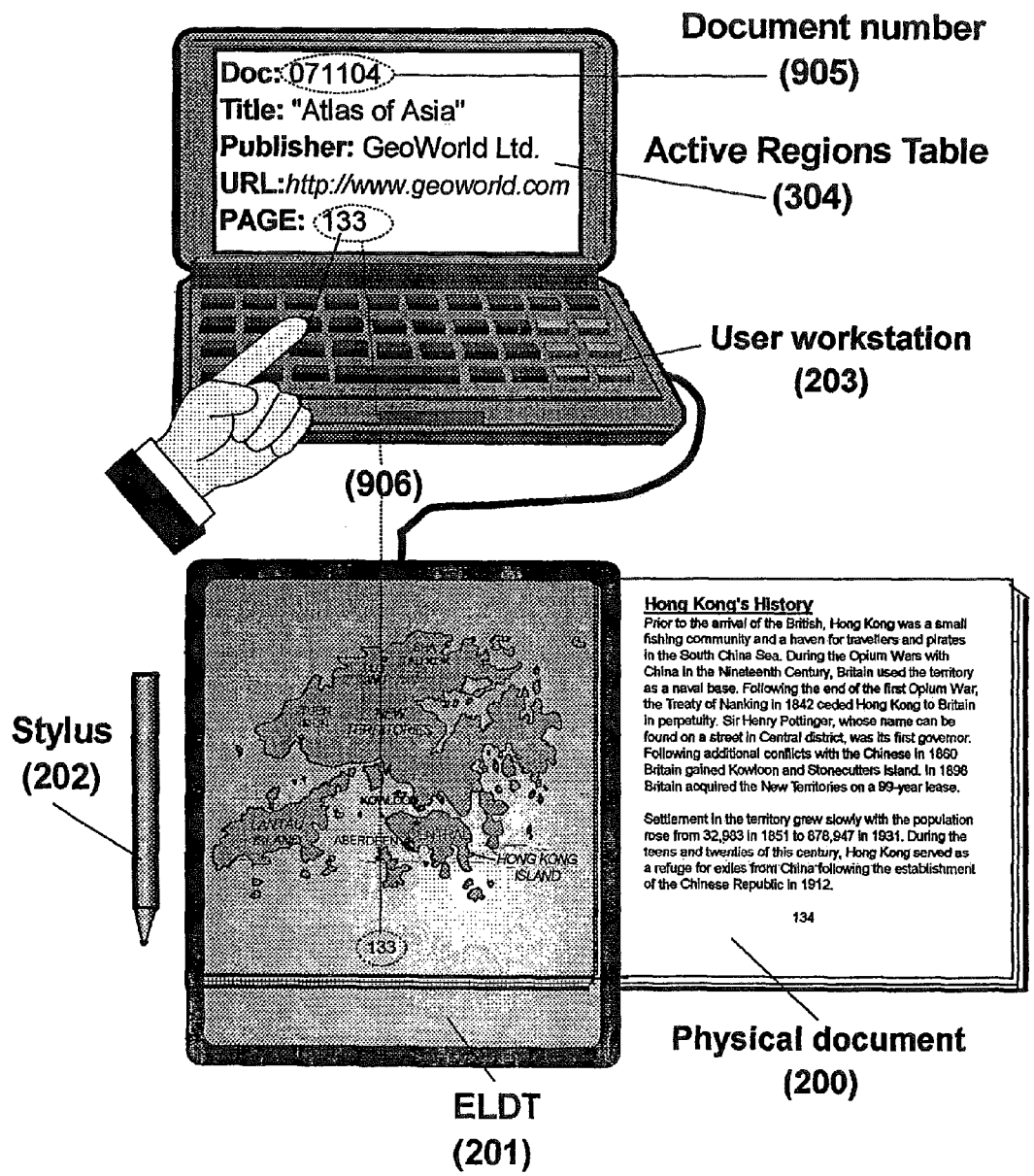
FIG. 9 illustrates a stage in use of the system of FIG. 2 where a user enters on the user workstation a document reference number and then, the system displays the active regions defined on document.

FIG. 9 further illustrates the foregoing steps of FIG. 17. While flipping through the pages or reading the document, the user finds on a certain page (e.g. "Page 133") 906 one or several items for which he or she would like to receive further information or access to some services. As was discussed herein before, by means of the present invention, the active regions of a physical document may be created by the final user (e.g., by the same reader), or alternatively, by the editor or publisher of said physical document. In the first case, because the Active Regions Table of the document has been created by the user, it should already be stored and immediately accessible by the user from the same user's workstation. In the second case, because the Active Regions Table has been created by the document publisher, usually it will be stored on a publisher's Web server for distribution to final users. In this second case, using the URL 306 of the Publisher Server and the document reference number 307, the final user (i.e., the reader) can access and download from the publisher server to the user workstations the Active Regions Table of the received document. As stated above, the URL 306 of the Publisher Server and the document reference number 307, used to identify the document and locate and retrieve through the Web the associated Active Regions Table, is printed or attached at a predefined reserved place on the physical document 200 (e.g., on the front cover, back cover or first page). In any case, in the following discussion it is assumed that the Active Regions Table of the selected physical document is already stored on the user workstation, or is accessible through a network (e.g., through the internet network) from the user workstation.

To access the Active Regions Table 304 of the selected physical document 200, by means of any user interface (keyboard, mouse, voice recognition software and microphone, . . . ) or any other reading means (e.g., barcode reader . . . ), the user enters codes or names for identifying the document. In the embodiment illustrated in FIG. 9, the user identifies the document by typing on the user workstation the physical document reference number or ISBN (e.g., "071104") 905. If an Active Regions Table 304 has been defined for this document number, it is accessed and displayed by the user workstation. FIG. 9 also illustrates how, once the Active Regions Table 304 is accessed and displayed by the user workstation 203, the user identifies the selected page of physical document 203 by typing the Page Number (e.g., page "133") 906.

Figure 10:
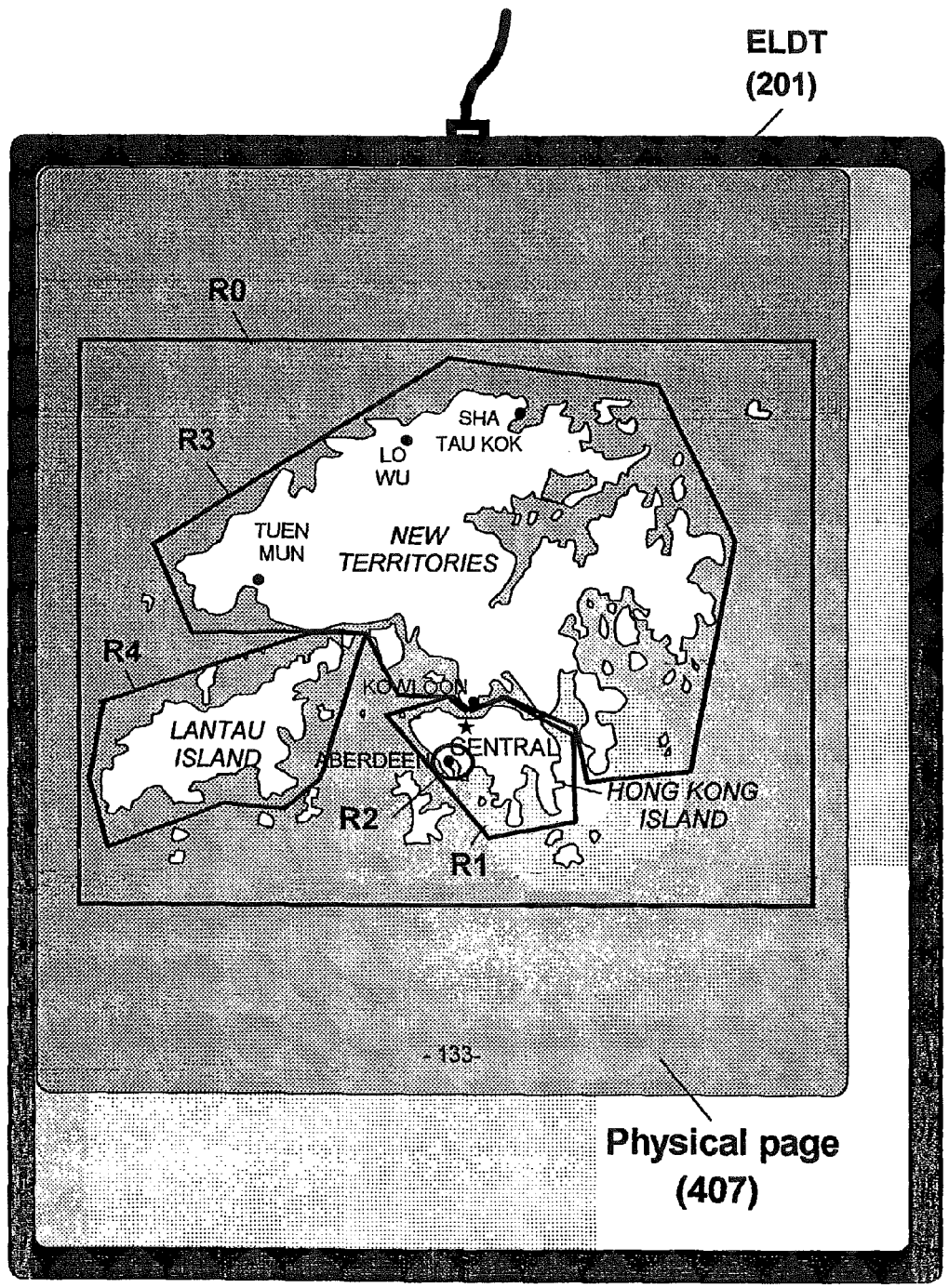
FIG. 10 illustrates a stage in the use of the system of FIG. 2 wherein a user specifies a page number of a multipage document, and the system displays the active regions for that page.

FIG. 10 shows how, once the user has identified to the system the selected page (e.g. "Page 133") 906 of physical document 200, the geometric data 604 of all active regions defined on this page is retrieved from the Active Regions Table 304 of the selected document. By means of an ELDT device driver, the user workstation controls the display of the active regions (e.g., R0, R1, R2, R3, R4), which are displayed highlighted by the ELDT device 201. This same figure shows how, by placing and aligning the transparent ELDT device over the physical page, the relationship of the active regions illuminated by the ELDT device and the content of physical page content becomes immediately apparent for the user.

Figure 11:
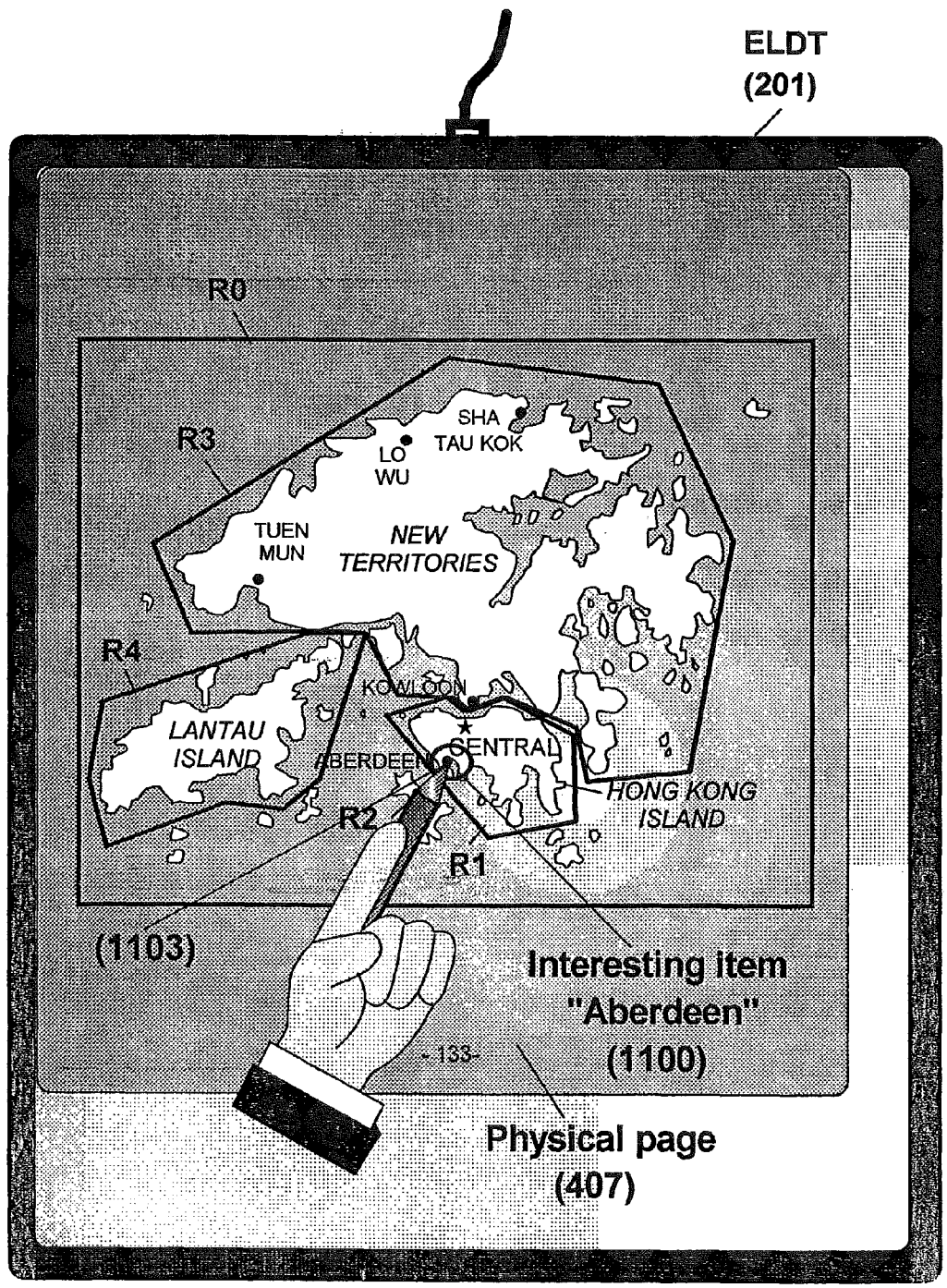
FIG. 11 illustrates a stage in the use of the system of FIG. 2 where the user touches and thereby selects an active region displayed on the page.

FIG. 11 illustrates how the user identifies an interesting item (e.g., "*Aberdeen*") on the physical page 407, and checks that this item is contained within an active region (e.g., R2), illuminated by the ELDT device 201. To select the item, the user, keeping aligned the transparent ELDT device 201 over the physical page, points with the stylus to a point 1103 on the ELDT device 201 over its position on the physical page. The coordinates of the point pointed by the user with the stylus, are sensed by the ELDT device 201 and are transmitted to the user workstation 203.

FIG. 12 illustrates how, when the user selects with the stylus an item 1200 on a physical page 407, the coordinates of the point sensed by the ELDT 201 are transmitted to the user workstation 203. From those coordinates, by means of interior point algorithms widely known by those skilled on the art, using geometric data 604 of the active regions (e.g., R0, R1, R2, R3, R4) stored on the Active Regions Table 304, corresponding to the selected physical page 407, the active regions that enclose the point selected by the user are identified (e.g., R2, R1, R0), and the information corresponding to those "selected" active regions 1200 is extracted from the Active Regions Table and displayed by the user workstation. This figure shows how, associated with a single point selected by the user on the physical page, a plurality of active regions and a plurality of hyperlinks associated with each region may be presented to the user on user workstation 203.

Figure 13:
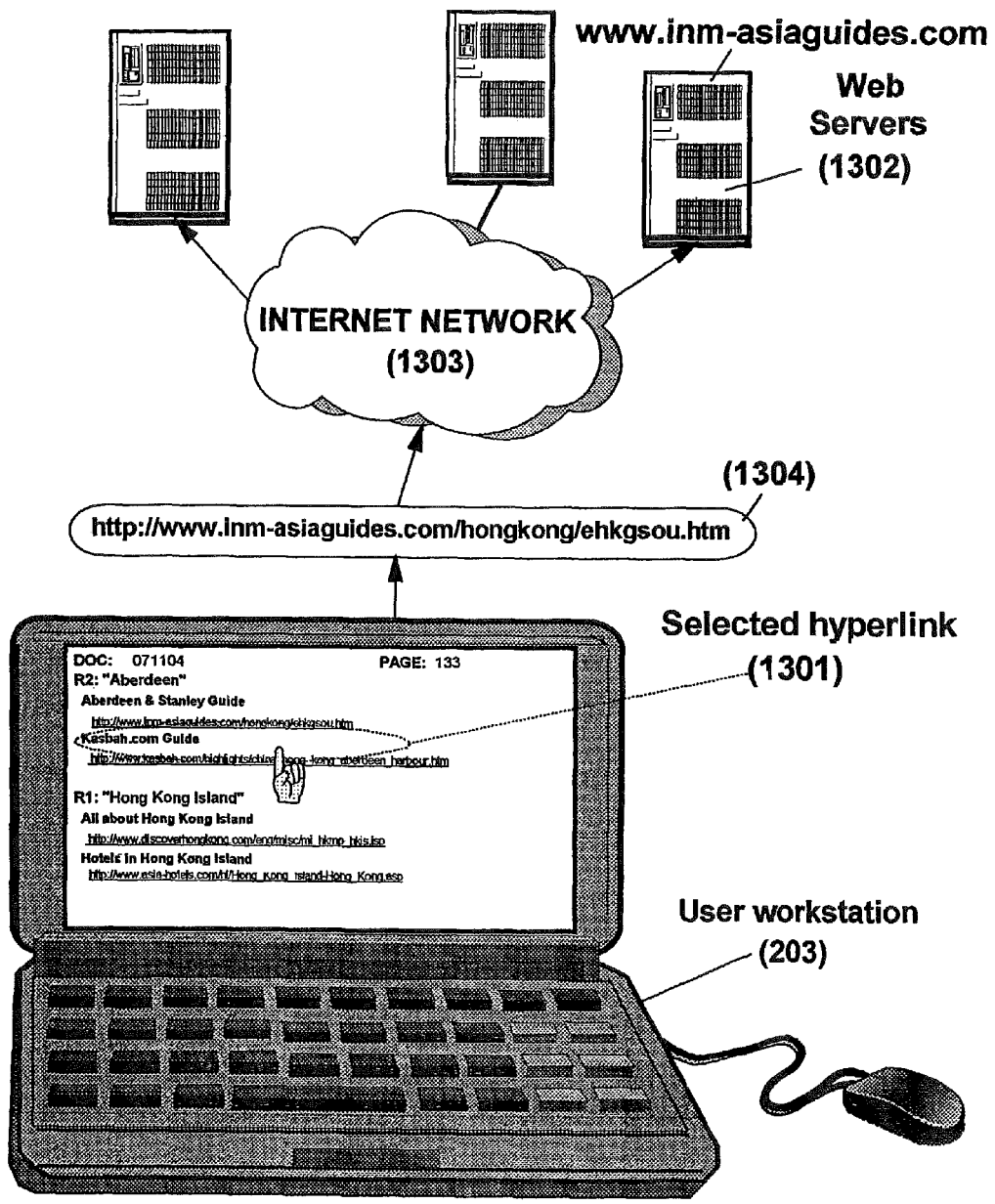
FIG. 13 illustrates a stage in the use of the system of FIG. 2 where a user selects one of the hyperlinks of FIG. 12, and the system fetches the information via the Internet.

FIG. 13 illustrates how from the list of active regions (e.g., R2, R1, R0) encompassing the selected point, and the descriptive hyperlinks related to those active regions, the user selects and triggers a hyperlink 1301 (e.g., "*Aberdeen & Stanley Guide*", defined on active region R2) to access related multimedia information or service from the Web. The destination address or URL associated with the selected hyperlink 1304 is identified from the corresponding entry in the Active Regions Table and is sent from the user workstation 203 through the internet 1303 to the corresponding Web server 1302.

Figure 14:
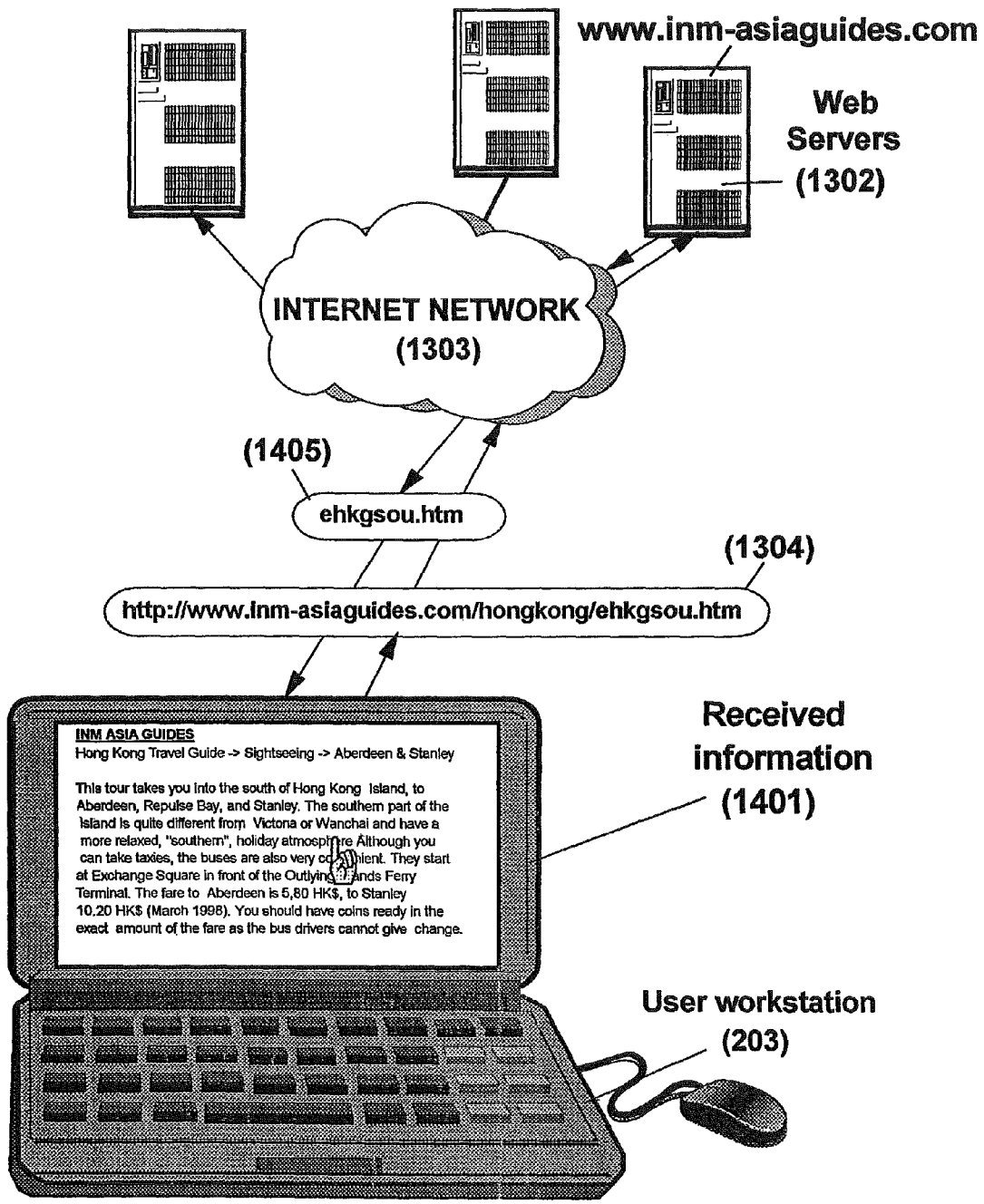
FIG. 14 illustrates a stage in the use of the system of FIG. 2 where the system displays on the user computer a web document corresponding to the hyperlink selected by the user in FIG. 13.

FIG. 14 illustrates how the requested multimedia information or service 1401, (e.g., HTML file named "ehkgsou.htm") related with the item selected by the user on the physical page 407, is received from Web server 1302, being finally played or displayed to the user on the user workstation 203.

There are alternative embodiments to the methods for selecting and accessing active regions on a physical document. On a first alternative embodiment, only active regions (if any) comprising the point pointed by the user with the stylus over the physical document are illuminated by transparent ELDT device. This alternative embodiment of the disclosed method has the advantage of focusing the attention of the user exclusively to the domain (i.e., to the content portion) related with the topic of interest that has been selected by the user, and introduces a minimum interference with the visibility of the document page through transparent ELDT device.

In another embodiment of the present invention, both visualization modes can be provided as options to the user. In a first mode, all active regions defined on the selected page can be simultaneously displayed to the user, so that the user can identify all printed items for which additional information could be accessible. In the second mode, only the selected active regions will be displayed to the user.

In another embodiment of the present invention, instead of using an ELDT device and a stylus for selecting and accessing multimedia information or services from active regions defined on physical documents, the user may alternatively prefer to use an opto-touch foil, and select illuminated active regions by touching with the finger over the opto-touch foil, instead of using a stylus.

Furthermore, if active regions illuminated by the ELDT device (or even by an opto-foil), can be seen by transparency through the physical page, the user can choose alternatively the transparent digitizing tablet or opto-foil to be placed under, instead of over, the physical document page.

Several possible applications of the present invention are described below. Each of these applications uses the same previously described method and system.

For example, a customer receives complex computer equipment, with an installation manual comprising drawings and schematics of parts and subassemblies of the equipment. With the transparent ELDT device over any one of these schematics, the user can immediately see certain parts of the complex schematic illuminated as active regions. These illuminated parts are identified as hyperlinks items and can be used for accessing additional information on a remote Web server or on a local computer. When the customer points to one of those illuminated regions, multimedia instructions showing how the part needs to be installed or serviced are displayed. It is not necessary to look through printed manuals to obtain this information. No complex navigation is required. A single printed copy of a general view of the equipment is sufficient to navigate with the system according to the present invention. The customer need only press with the stylus on the desired illuminated region on the surface of the installation manual.

A subscriber reading a newspaper or magazine, may be interested in seeing computer multimedia or TV video information associated with the articles he or she reads. While reading the sports pages (e.g., on the New York Times), key events can be instantly recalled and played on demand (e.g., the opening ceremony of Athens Olympic Games, the last images of the "Tour de France", the last tennis match on Wimbledon, etc.) simply by touching highlighted regions encompassing titles, news or editorial sections printed on newspaper pages.

A user flipping through the paper pages and glancing printed figures and text on a newspaper written in a foreign language (such as the Japanese language edited sample of "Asahi Shimbun", shown in FIG. 1), may select a section of the newspaper content (e.g., an article), and receive from the newspaper publisher server the selected content translated to the user's native language (e.g., to receive the selected article translated to English).

Today, many free-toll calls originate from people reading advertisements in newspapers or magazines or in direct mail ads. According to the present invention, people can instantly access multimedia presentations of advertised products or services simply by pointing to the highlighted ads that have drawn their attention.

Extensive reading is easier to do from paper, but animated video explanations and demonstrations are much more effective for some purposes. The two features can be tied together by creating active regions on selected items printed in a textbook. These hyperlinked active regions can, for example, link textbook pictures, paragraphs or sections, to live discussion groups with other students or to live interactions with professors and tutors.

What has been described is merely illustrative of the application of the principles of the present invention. Other arrangements and methods can be implemented by those skilled in the art without departing from the spirit and scope of the present invention.

The invention claimed is:

1. A method for processing information relating to active regions of a page of physical document so that a user can access corresponding information via a workstation, said method comprising:
   recording in an active regions table within the workstation, an identification of the page of the physical document, said page having been identified to the workstation by a first user after the first user positioned a transparent electro-luminescent tablet or other touch sensitive plate over the page, said tablet or plate being coupled to the workstation;
   receiving, by the workstation from the tablet or plate, a plurality of active regions traced on the page by the first user;
   after said receiving the plurality of active regions traced on the page by the first user, receiving, by the workstation from the first user, an identification of each active region of the plurality of active regions and at least one hyperlink associated with each active region of the plurality of active regions;
   after said receiving the plurality of active regions traced on the page by the first user and after said receiving the identification of each active region and the associated at least one hyperlink, said workstation recording information in the active regions table, wherein the information comprises said identification of each active region of the plurality of active regions, geometric coordinates defining an outline of each active region of the plurality of active regions, and the at least one hyperlink associated each active region of the plurality of active regions;
   after said recording information, receiving by the workstation identifying coordinates of only one point on the tablet or page that was pointed to by a second user while the only one point was aligned over a single point on the page, wherein at least one active region of the plurality of active regions comprises the single point;
   identifying, by the workstation through use of the received identifying coordinates and the information recorded in the active regions table, the at least one active region comprising the single point; and
   displaying on a computer screen of the workstation, the at least one hyperlink associated with each active region of the identified at least one active region.

2. The method of claim 1, wherein the at least one active region comprises at least two active regions of the plurality of active regions, and wherein the single point is common to overlapping portions of the at least two active regions.

3. The method of claim 1, wherein the at least one active region consists of one active region of the plurality of active regions.

4. The method of claim 1, wherein the information further comprises text relating to each hyperlink of the at least one hyperlink associated with each active region of the plurality of active regions, and wherein said displaying further comprises displaying the recorded text relating to each hyperlink of the at least one hyperlink associated with each active region of the identified at least one active region.

5. The method of claim 1, wherein said displaying further comprises displaying the identification of the page of the physical document and an ISBN number of the physical document, and wherein said displaying further comprises displaying the identification of the page and the ISBN number.

6. The method of claim 1, wherein the method further comprises recording in the active regions table: a title of the physical document, a publisher of the physical document, and an internet address of the publisher.

7. The method of claim 1, wherein the first user and the second user are different users.

8. A computer program product, comprising a computer readable storage medium having computer readable program instructions embodied therein, said computer readable program instructions configured to be executed by a processor of a workstation to implement a method for processing information relating to active regions of a page of physical document so that a user can access corresponding information via the workstation, said method comprising:
   recording in an active regions table within the workstation, an identification of the page of the physical document, said page having been identified to the workstation by a first user after the first user positioned a transparent electro-luminescent tablet or other touch sensitive plate over the page, said tablet or plate being coupled to the workstation;
   receiving, by the workstation from the tablet or plate, a plurality of active regions traced on the page by the first user;
   after said receiving the plurality of active regions traced on the page by the first user, receiving, by the workstation from the first user, an identification of each active region of the plurality of active regions and at least one hyperlink associated with each active region of the plurality of active regions;
   after said receiving the plurality of active regions traced on the page by the first user and after said receiving the identification of each active region and the associated at least one hyperlink, said workstation recording information in the active regions table, wherein the information comprises said identification of each active region of the plurality of active regions, geometric coordinates defining an outline of each active region of the plurality of active regions, and the at least one hyperlink associated each active region of the plurality of active regions;
   after said recording information, receiving by the workstation identifying coordinates of only one point on the tablet or page that was pointed to by a second user while the only one point was aligned over a single point on the page, wherein at least one active region of the plurality of active regions comprises the single point;
   identifying, by the workstation through use of the received identifying coordinates and the information recorded in the active regions table, the at least one active region comprising the single point; and
   displaying on a computer screen of the workstation, the at least one hyperlink associated with each active region of the identified at least one active region.

9. The computer program product of claim 8, wherein the at least one active region comprises at least two active regions of the plurality of active regions, and wherein the single point is common to overlapping portions of the at least two active regions.

10. The computer program product of claim 8, wherein the at least one active region consists of one active region of the plurality of active regions.

11. The computer program product of claim 8, wherein the information further comprises text relating to each hyperlink of the at least one hyperlink associated with each active region of the plurality of active regions, and wherein said displaying further comprises displaying the recorded text relating to each hyperlink of the at least one hyperlink associated with each active region of the identified at least one active region.

12. The computer program product of claim 8, wherein said displaying further comprises displaying the identification of the page of the physical document and an ISBN number of the physical document, and wherein said displaying further comprises displaying the identification of the page and the ISBN number.

13. The computer program product of claim 8, wherein the method further comprises recording in the active regions table: a title of the physical document, a publisher of the physical document, and an internet address of the publisher.

14. The computer program product of claim 8, wherein the first user and the second user are different users.

15. A computer system comprising a workstation that includes a computer readable storage medium containing program instructions configured to be executed by a processor of the workstation to implement a method for processing information relating to active regions of a page of physical document so that a user can access corresponding information via the workstation, said method comprising:

recording in an active regions table within the workstation, an identification of the page of the physical document, said page having been identified to the workstation by a first user after the first user positioned a transparent electro-luminescent tablet or other touch sensitive plate over the page, said tablet or plate being coupled to the workstation;

receiving, by the workstation from the tablet or plate, a plurality of active regions traced on the page by the first user;

after said receiving the plurality of active regions traced on the page by the first user, receiving, by the workstation from the first user, an identification of each active region of the plurality of active regions and at least one hyperlink associated with each active region of the plurality of active regions;

after said receiving the plurality of active regions traced on the page by the first user and after said receiving the identification of each active region and the associated at least one hyperlink, said workstation recording information in the active regions table, wherein the information comprises said identification of each active region of the plurality of active regions, geometric coordinates defining an outline of each active region of the plurality of active regions, and the at least one hyperlink associated each active region of the plurality of active regions;

after said recording information, receiving by the workstation identifying coordinates of only one point on the tablet or page that was pointed to by a second user while the only one point was aligned over a single point on the page, wherein at least one active region of the plurality of active regions comprises the single point;

identifying, by the workstation through use of the received identifying coordinates and the information recorded in the active regions table, the at least one active region comprising the single point; and displaying on a computer screen of the workstation, the at least one hyperlink associated with each active region of the identified at least one active region.

16. The computer system of claim 15, wherein the at least one active region comprises at least two active regions of the plurality of active regions, and wherein the single point is common to overlapping portions of the at least two active regions.

17. The computer system of claim 15, wherein the at least one active region consists of one active region of the plurality of active regions.

18. The computer system of claim 15, wherein the information further comprises text relating to each hyperlink of the at least one hyperlink associated with each active region of the plurality of active regions, and wherein said displaying further comprises displaying the recorded text relating to each hyperlink of the at least one hyperlink associated with each active region of the identified at least one active region.

19. The computer system of claim 15, wherein said displaying further comprises displaying the identification of the page of the physical document and an ISBN number of the physical document, and wherein said displaying further comprises displaying the identification of the page and the ISBN number.

20. The computer system of claim 15, wherein the method further comprises recording in the active regions table: a title of the physical document, a publisher of the physical document, and an internet address of the publisher.

21. The computer system of claim 15, wherein the first user and the second user are a same user.

\* \* \* \* \*